US005870682A

United States Patent [19]

Miwa et al.

[11] Patent Number: 5,870,682

[45] Date of Patent: Feb. 9, 1999

[54] RECEIVER FOR ADAPTIVELY DISPLAYING A PLURALITY OF DATA PAGES

[75] Inventors: Kenji Miwa; Kazuhiro Kishimoto; Kazunori Iwaki; Yasumasa Matsumoto; Munekazu Nakagawa, all of Hiroshima, Japan

[73] Assignee: Sharp Kabushiki Kaisha, Osaka, Japan

[21] Appl. No.: 623,162

[22] Filed: Mar. 28, 1996

[30] Foreign Application Priority Data

Sep. 20, 1995 [JP] Japan .................................... 7-241866
Oct. 3, 1995 [JP] Japan .................................... 7-256078

[51] Int. Cl.[6] ........................................ H04B 7/00

[52] U.S. Cl. ............................ 455/566; 455/45; 455/38.4

[58] Field of Search ............................ 455/45, 66, 186.1, 455/186.2, 154.1, 158.4, 158.5, 180.1, 185.1, 572, 566, 38.4, 38.1; 340/825.44

[56] References Cited

U.S. PATENT DOCUMENTS

| | | | |
|---|---|---|---|
| 4,887,308 | 12/1989 | Dutton | 455/158.4 |
| 5,107,259 | 4/1992 | Weitzen et al. | 340/825.44 |
| 5,212,477 | 5/1993 | Indekeu et al. | 340/825.44 |
| 5,408,686 | 4/1995 | Mankovitz | 455/66 |
| 5,491,838 | 2/1996 | Takahisa et al. | 455/186.1 |
| 5,524,140 | 6/1996 | Klausner et al. | 455/566 |

FOREIGN PATENT DOCUMENTS

| | | |
|---|---|---|
| 5-110999 | 4/1993 | Japan . |
| 5-252123 | 9/1993 | Japan . |

*Primary Examiner*—Nguyen Vo
*Assistant Examiner*—Lester G. Kincaid

[57] ABSTRACT

Digital data extracted from an FM multiplex broadcasting wave is decoded by an FM multiplex decoder. The decoder FM multiplex data is applied to a CPU. According to a logic of a switch, the CPU selects display of one page or a plurality of pages to read out predetermined data from memory according to the selected result. Display data is produced on the basis of the decoded FM multiplex data and each readout data. The produced display data is provided to a display unit. The display unit selectively displays data of one page or data of a plurality of pages simultaneously on one screen according to the input display data. The data of each page is identified and displayed corresponding to each data using an identifier.

6 Claims, 23 Drawing Sheets

| FS1 | FS0 | CG ROM ADDRESS |
|---|---|---|
| 0 | 0 | 00000H ~ 7FFFFH |
| 0 | 1 | 80000H ~ FFFFFH |
| 1 | 0 | 100000H ~ 17FFFFH |
| 1 | 1 | 180000H ~ 1FFFFFH |

| b4 b3 b2 b1 | DISPLAY FORMAT | NUMBER OF DISPLAY CHARACTERS NUMBER OF DOTS CORRESPONDING TO STANDARD CHARACTER IN ( ) |
|---|---|---|
| 0 0 0 1 | FORMAT 0 | 2.5 LINES, 15.5 CHARACTERS ( 60×248) |
| 0 0 1 1 | FORMAT 1 | 8.5 LINES, 15.5 CHARACTERS (204×248) |
| 0 1 0 1 | FORMAT 2 | 17 LINES, 31 CHARACTERS (408×496) |
| 0 1 1 1 | FORMAT 3 | 20 LINES, 40 CHARACTERS (200×240) |
| 0 0 0 0 | FREE FORMAT | — |

RECEIVER FOR ADAPTIVELY DISPLAYING A PLURALITY OF DATA PAGES

BACKGROUND OF THE INVENTION

1. Field of the Invention

The present invention relates to a receiver for FM multiplex broadcasting, and more particularly, to a multiplex broadcasting receiver for receiving digital data of program information, weather forecast information, and the like multiplexed with a radio broadcasting wave and transmitted from a broadcasting station, and displaying the received digital data.

2. Description of the Background Art

FM multiplex broadcasting is one broadcasting system that multiplexes signals utilizing a spectrum region of a high base band spectrum of FM stereo audio broadcasting to provide service utilizing characters and figures in addition to the existing stereo broadcasting. A plurality of display formats of the FM multiplex broadcasting program are defined. FIG. 32 shows the display formats for FM multiplexed broadcasting programs. Referring to FIG. 32, the current display formats include five types of formats, i.e. formats 0–3 and a free format. Each display format is identified by the data transmitted as display format data. For example, a display format data "0001" designates format 0, wherein the number of display characters of one page is 2.5 lines×15.5 characters, which is 60×248 dots when calculated as the number of dots corresponding to a standard character. Similarly, formats 1–3 and the free format are defined as shown in FIG. 32.

A structure of a program data header including the data of the above-described display format will be described hereinafter. FIG. 33 is a diagram showing a structure of a program data header. Referring to FIG. 33, an 8-bit information separation code is stored in data block DB (n). Data header parameter of 8 bits is stored in data block DB (n+1). These are data header identifiers.

A program number of 8 bits is stored in data block DB (n+2). Information of 2 bits related to content update and the total number of pages in 6 bits are stored in data block DB (n+3). A presentation function of 8 bits is stored in data block DB (n+4). Information type of 4 bits and display format of 4 bits is stored in data block DB (n+5). Each of these data is a data header data.

The program data header is formed as described above. Data of the display format of FIG. 32 is stored in the lower 4 bits of data block DB (n+5). Therefore, the display format of each program is defined by the contents of the program information transmitted from a broadcasting source.

As described above, the display format is defined according to the program data header of each program. In a conventional FM multiplex broadcasting receiver, display was carried out exactly according to the display format specified by the broadcasting station on the basis of a predefined display format. Furthermore, the character size (display frame) of the display characters is limited to one of a range of specified sizes (number of horizontal dots: fixed to 16 dots; number of vertical dots: 18–24 dots in the Japanese language, for example). In other words, one type of character size was employed according to the application and grade of the FM multiplex broadcasting receiver.

As described above, the amount of information that can be displayed on one screen differs according to the display format in FM multiplex broadcasting. An FM multiplex broadcasting receiver corresponding to the format having the greatest display capacity of one screen of FM multiplex broadcasting becomes the most convenient apparatus for the user since the greatest amount of the information can be displayed. With an FM multiplex broadcasting receiver for format 1, information of one page of formats 0 and 1 can be displayed in one screen. In the case of an FM multiplex broadcasting receiver for format 0, information of one page of a program of format 0 can be displayed on one screen, but one page of information of format 1 cannot be displayed at the same time on that one screen. Therefore, display was effected by dividing the screen into a plurality of subscreens by operation of scrolling or the like.

In an FM multiplex broadcasting receiver corresponding to a display format of the greatest display capacity of one screen, a display unit and a memory of great capacity are required, resulting in a very expensive apparatus. Commercially, the factor of cost is given priority over the above-described operability in current FM multiplex broadcasting receivers. Therefore, FM multiplex broadcasting receivers for format 0 that can be manufactured at low cost are the main stream in the market. Since the amount of information that can be displayed in one screen is small under format 0 (display of 2.5 lines and 15.5 characters), the content of each program is sub-divided into a plurality of pages. The user selects the sub-divided pages individually for display on the display screen. There was a problem that the operation thereof is tedious.

The display format of FM multiplex broadcasting has the display region on the display screen defined physically, i.e. the header display region and the main passage display region. Here, information displayed in the header display region is, for example, the name of the broadcasting station, the broadcasting frequency, the page number, and the program name corresponding to the display in the main passage, which are information supplementary to the main passage (the program contents selected by the user to be displayed). For example, in an FM multiplex broadcasting receiver corresponding to format 0, the header display region occupied 20% of the entire display region.

FIG. 34 shows a display region of format 0. Referring to FIG. 34, the upper portion of the display region includes a header display region of 0.5 lines in width, and a main passage display region of 2 lines in width thereunder. Information of the header is always displayed in the header display region even when that information is not required. Furthermore, since one of the defined sizes (16×18~24 dots: the horizontal 16 dots is fixed in the Japanese language, for example) is employed, the dimension of the display character is fixed to that of the FM multiplex broadcasting receiver. Thus, the user cannot change the display character dimension arbitrarily (magnify/reduce the text), and operation for omitting the header cannot be specified. There was a problem that the level of visual confirmation of the information displayed on the display screen, and operability of the apparatus is not acceptable.

The program includes a sequential complementary type attribute and storage information type attribute. A sequential complementary program has information displayed only at the time of reception. The received information does not have to be stored at the receiver side. For example, the name of the tune or the singer displayed in association with the broadcasting music corresponds to this type. In contrast, a storage information type program stores the received information at the receiver side and displays the stored information. By receiving and storing a plurality of pages of information such as news, the user can view the news while scrolling through the pages. The program received in format

0 includes some sequential complementary programs and a plurality of storage information programs.

At the FM multiplex broadcasting receiver side, a menu screen of program information transmitted from the broadcasting station side appears to display a selected program. In a display device that can display a plurality of pages on one screen, a plurality of pages are displayed with and without the header.

In such a display device in which a plurality of pages can be displayed, a header of the same contents will be repeatedly displayed to result in loss of the display region when the display includes the header. In the case of a display output without the header, there was a problem that the contents of the program of respective pages cannot be identified. Furthermore, the latest page cannot be identified when scrolling back to a page associated with a sequential complementary program. Furthermore, it was not possible to view the contents of another storage information program during the waiting period for reception of the updated page of the sequential complementary program.

SUMMARY OF THE INVENTION

In view of the foregoing, an object of the present invention is to provide an FM multiplex broadcasting receiver that can display information of a plurality of pages of a display format simultaneously to improve visual confirmation of information and operability of the apparatus.

An FM multiplex broadcasting receiver according to the present invention includes an extraction circuit for extracting data from an FM multiplex broadcasting wave on which data corresponding to a predetermined display format is multiplexed, and a display unit for displaying data of a plurality of pages of the display format simultaneously on one screen on the basis of data extracted by the extraction circuit.

According to this structure, data of a plurality of pages of the display format can be displayed simultaneously on one screen. Visual confirmation of information can be improved since a great amount of information can be displayed at one time. The number of switching times of the display screen can be reduced to improve operability of the apparatus.

In addition to the above-described structure, the FM multiplex broadcasting receiver according to the present invention further includes a selection circuit for selecting a plurality of pages of data to be displayed on the display unit. The display unit displays data according to the number of pages selected by the selection circuit.

According to the structure, the user can have data displayed of a desired number of pages out of the plurality of pages that can be displayed on the screen by the display unit. Visual confirmation of information can further be improved to increase the operability of the device.

In addition to the above-described structure, the FM multiplex broadcasting receiver of the present invention further includes a font data storage circuit for storing character font data of a plurality of sizes corresponding to the data that will be displayed by the display unit, and a font data selection circuit for selecting an optimum character font data from the character font data of a plurality of sizes according to a number of pages displayed by the display unit. The display unit displays data according to the character font data selected by the font data selection circuit.

According to the structure, data can be displayed according to the optimum character font data selected depending upon the number of pages to be displayed. Therefore, information of many more pages can be displayed even when the display capacity of the screen of the display unit is small. Thus, visual confirmation of the information can further be improved to facilitate the operability of the apparatus.

In addition to the above-described structure of the FM multiplex broadcasting receiver, the display unit can display data in a separated manner for each page when a plurality of pages of data are to be displayed.

Since data for each page can be arranged in a divided manner to be displayed, separation between the pages can be emphasized to further improve visual confirmation of each page.

In addition to the above-described structure of the FM multiplex broadcasting receiver of the present invention, the display unit switches the data display of the screen that corresponds to a particular display format when the extraction circuit extracts data which corresponds to the particular display format.

According to this structure, data corresponding to a particular display format is displayed with priority over other data when such data of a particular display format is extracted. Therefore, data corresponding to a particular display format can be acknowledged promptly.

In addition to the above-described structure, the FM multiplex broadcasting receiver of the present invention includes an identifier display circuit for displaying on the same screen an identifier for identifying data of a plurality of pages displayed by the display unit. In the case of display of the plurality of pages, the contents of the data of respective pages can be promptly identified.

In addition to the above-described FM multiplex broadcasting receiver of the present invention, data corresponding to the display format is data of one or more programs. When data of a plurality of pages is to be displayed, the display unit displays either data of a plurality of different programs or data of the same program.

Whether the displayed data is of different programs or of the same program is explicitly indicated by the identifier. Therefore, connection of each displayed page can be recognized promptly.

In addition to the above-described structure, the FM multiplex broadcasting receiver of the present invention includes an extraction data storage circuit for sequentially storing data extracted by the extraction circuit. When data of a plurality of pages is to be displayed, the display unit provides display of a plurality of pages including data of the latest page extracted by the extraction circuit and data of a previous page stored in the extraction storage circuit of the same program.

Whether the data of a plurality of pages displayed on the same screen is of the latest page or of a previous page is explicitly indicated by the identifier. Therefore, the latest data matching the currently broadcasting contents and earlier data broadcasted before can be recognized at the same time to improve visual confirmation of information.

In addition to the above-described structure of the FM multiplex broadcasting receiver of the present invention, display of a plurality of pages of data is provided including data of the latest page extracted by the extraction circuit of a first program and data stored in the extraction data storage circuit of a second program that is read out while page-scrolling.

According to this structure, data is displayed regarding whether the plurality of pages of data displayed on the same screen is of the latest page of the first program or of a previous page broadcasted before of the second program that is being scrolled. Therefore, a great amount of data can be obtained in a short time period while identifying simultaneously data of the latest page matching the current broadcasting contents for the first program and scrolled data broadcasted before of the second program. Thus, visual confirmation of information is improved.

In addition to the above-described structure of the FM multiplex broadcasting receiver of the present invention, the display circuit displays data omitting a portion of a predetermined display format.

Therefore, information that is already recognized such as a header can be omitted to allow more display of new information. Visual confirmation of required information can be improved, and the number of switching times of the display screen can be reduced to improve the operability of the apparatus. Each data can be identified by the identifier even when the header is omitted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
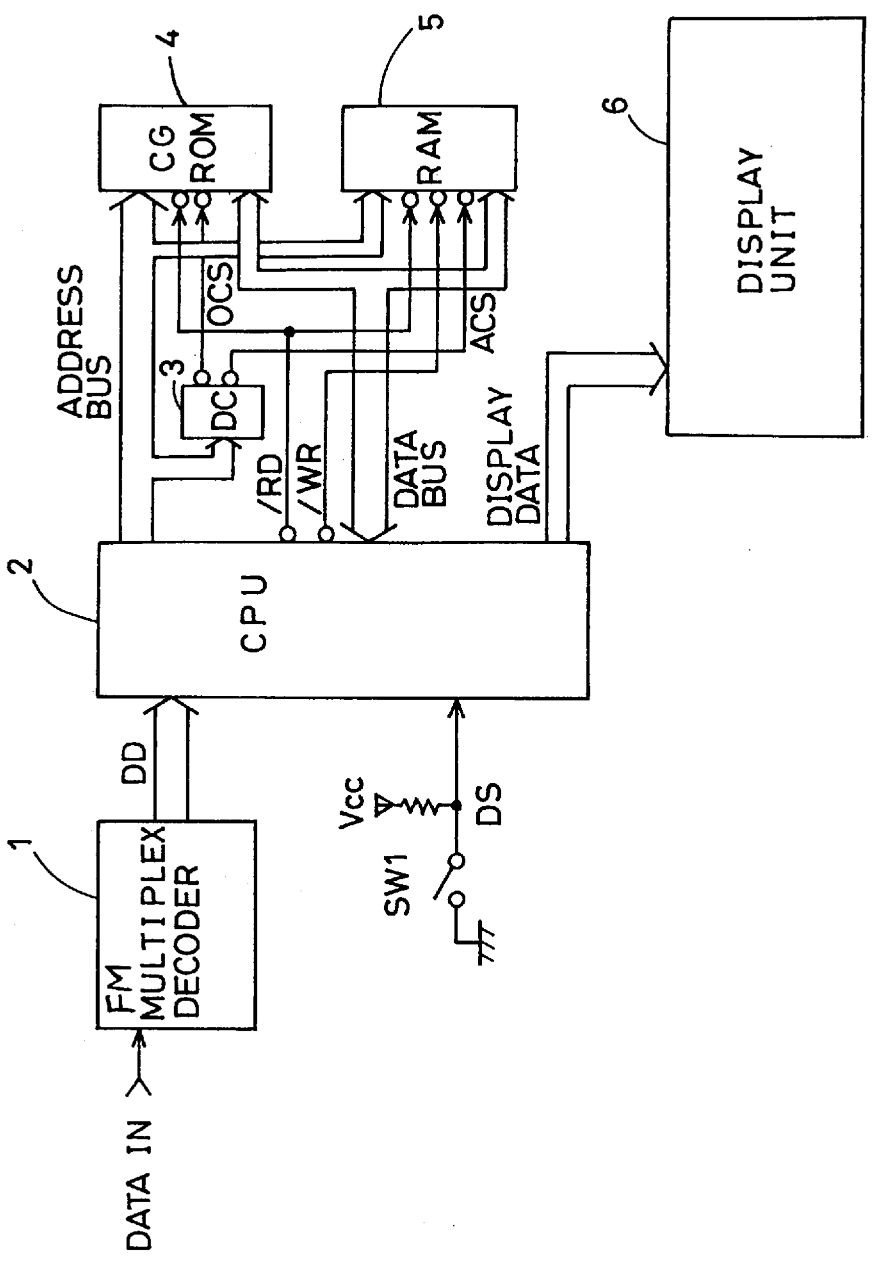
FIG. 1 is a block diagram showing a structure of an FM multiplex broadcasting receiver according to a first embodiment of the present invention.

Referring to FIG. 1, an FM multiplex broadcasting receiver according to a first embodiment of the present invention includes an FM multiplex decoder 1, a CPU (Central Processing Unit) 2, a decoder (DC) 3, a CGROM (display font data storage read only memory) 4, a RAM (Random Access Memory) 5, a display unit 6, and a switch SW1.

An FM multiplex broadcast is received by a receiver not shown. Multiplexed digital data is extracted from the received FM multiplex broadcasting wave to be applied to FM multiplex decoder 1. FM multiplex decoder 1 decodes the input data and provides FM multiplex data DD to CPU 2. CPU2, CGROM 4, and RAM 5 are connected by an address bus and a data bus. CPU 2 provides an address signal via the address bus. A portion of the address signal is applied to decoder 3. The input address signal is decoded to be provided to CGROM 4 and RAM 5 as a ROM chip select signal OCS and a RAM chip select signal ACS, respectively. The remaining portion of the address signal is directly provided to CGROM 4 and RAM 5 to specify an address of CGROM 4 and RAM 5.

CPU 2 provides a read signal/RD to CGROM 4 and RAM 5. In response, CGROM 4 and RAM 5 effect a read operation. CPU 2 provides a write signal/WR to RAM 5. In response, RAM 5 carries out a write operation. CPU 2 has a structure to send and receive data to and from CGROM 4 and RAM 5 via the data bus.

CPU 2 produces display data on the basis of the input FM multiplex data DD, and provides the display data to display unit 6. Display unit 6 displays a predetermined screen according to the input display data. CPU 2 receives a display select signal DS from switch SW1 having one end connected to ground potential and the other end connected to power supply potential $V_{CC}$. In response to the level of display select signal DS, CPU 2 selects the number of pages to be displayed on display unit 6. Although the following description will be provided for an embodiment including only one switch SW1 since display of two types of pages is to be effected, the number of switches may be increased when a predetermined number of pages are to be selected from three or more types of pages to specify the number of pages to be displayed according to combination of the logic of a plurality of display select signals.

An operation of an FM multiplex broadcasting receiver of the above-described structure is set forth in the following. Display select signal DS from switch SW1 designates simultaneous display of two pages of data at an H level (logical high), and designates display of one page of data at an L level (logical low).

When switch SW1 is turned off and display select signal DS of an H level is input, CPU 2 produces 2 pages of display data according to FM multiplex data DD output from FM multiplex decoder 1. Here, the display font data of the data to be displayed is stored in CGROM 4. Display data is produced using this display font data. The produced display data is provided to display unit 6. Display unit 6 displays two pages of data of a display format at the same time on the display screen.

Figure 2:
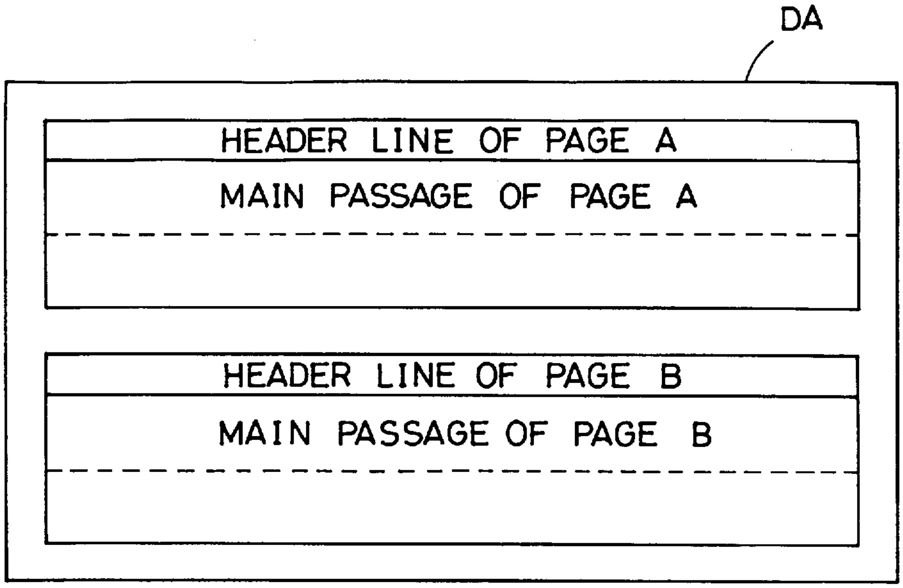
FIG. 2 shows an example of the case where two pages of data are displayed by the FM multiplex broadcasting receiver of FIG. 1.

The case of format 0 will be described hereinafter as an example of a display screen according to the above operation. Referring to FIG. 2, a header line of page A and a main passage of page A are displayed at the upper portion of display region DA of display unit 6, and a header line of page B and a main passage of page B are displayed at the lower portion of display region DA.

Figure 3:
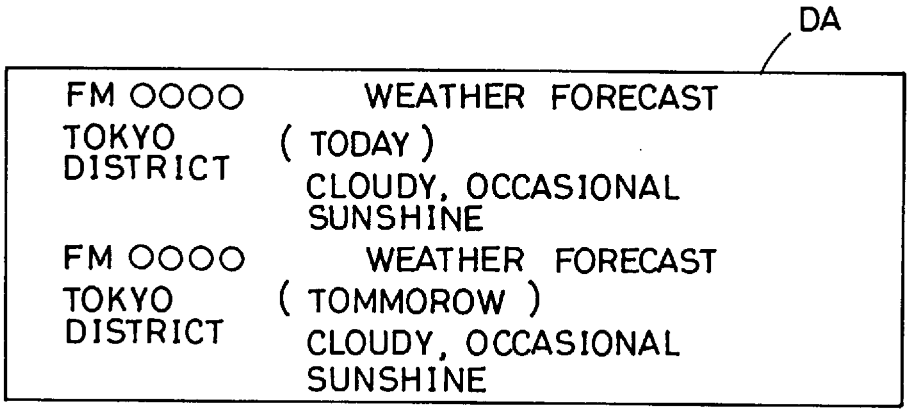
FIG. 3 shows a specific display example of FIG. 2.

A specific example thereof is shown in FIG. 3. FIG. 3 shows a specific example of a weather forecast program. On-display region DA of display unit 6, the header line of page A "FM ○○○○ Weather Forecast" and the main passage of page A "Tokyo District (today) cloudy, occasional sunshine" are displayed. At the lower portion on display region DA, the header line of page B "FM ○○○○ Weather Forecast" and the main passage of page B "Tokyo District (tomorrow) cloudy, occasional sunshine" are displayed.

When switch SW1 is turned on, display select signal DS attains an L level to specify display of only one page to CPU 2. CPU 2 responds to display select signal DS to produce display data of one page using the display font data of CGROM 4 according to the input FM multiplex data DD. The produced display data is provided to display unit 6. Accordingly, display unit 6 displays one page of data.

Figure 4:
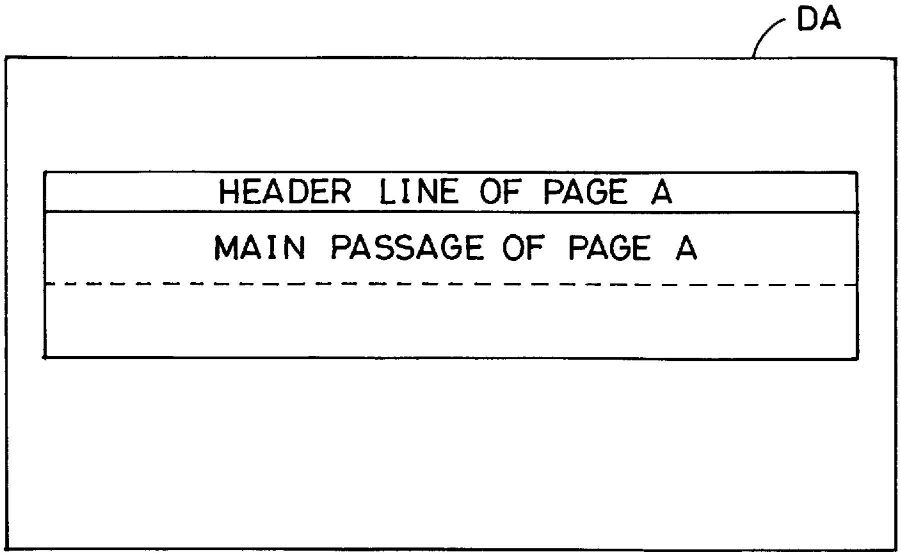
FIG. 4 shows an example of a display of one page of data by the FM multiplex broadcasting receiver of FIG. 1.
Figure 5:
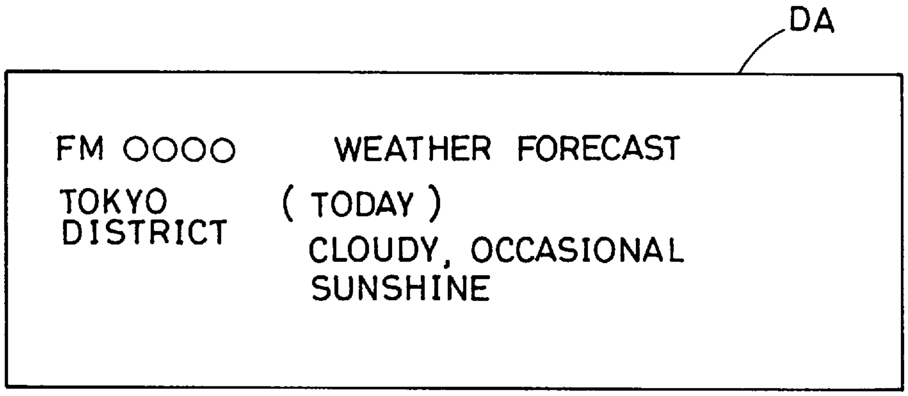
FIG. 5 shows a specific display example of FIG. 4.

An example of display of one page according to the above operation will be described with reference to FIG. 4 according to format 0. Referring to FIG. 4, the header line of page A and the main passage of page A are displayed substantially at the middle of display region DA, and only data of one page is displayed. FIG. 5 shows a specific example thereof. The header line of page A "FM ○○○○ Weather Forecast" and a main passage of page A "Tokyo District (today) cloudy, occasional sunshine" are displayed at the middle of display region DA.

One page of data or two pages of data can be selectively displayed on the display screen of display unit 6 according to the level of display select signal DS.

An FM multiplex broadcasting receiver according to a second embodiment will be described with reference to FIG. 6. The FM broadcasting receiver differs from the FM multiplex broadcasting receiver of FIG. 1 in that display font data of 16×16 font and 16×24 font in the Japanese language are prestored in CGROM 4*a*. The remaining elements are similar to those of the FM multiplex broadcasting receiver of FIG. 1, and detailed description thereof will not be repeated. In the second embodiment, the display font data of 16×16 font is used when a plurality of pages are to be displayed. The display font data of 16×24 font is used when only one page is to be displayed. More information can be displayed on a limited display region of display unit 6 in the case of display of a plurality of pages.

Figure 7:
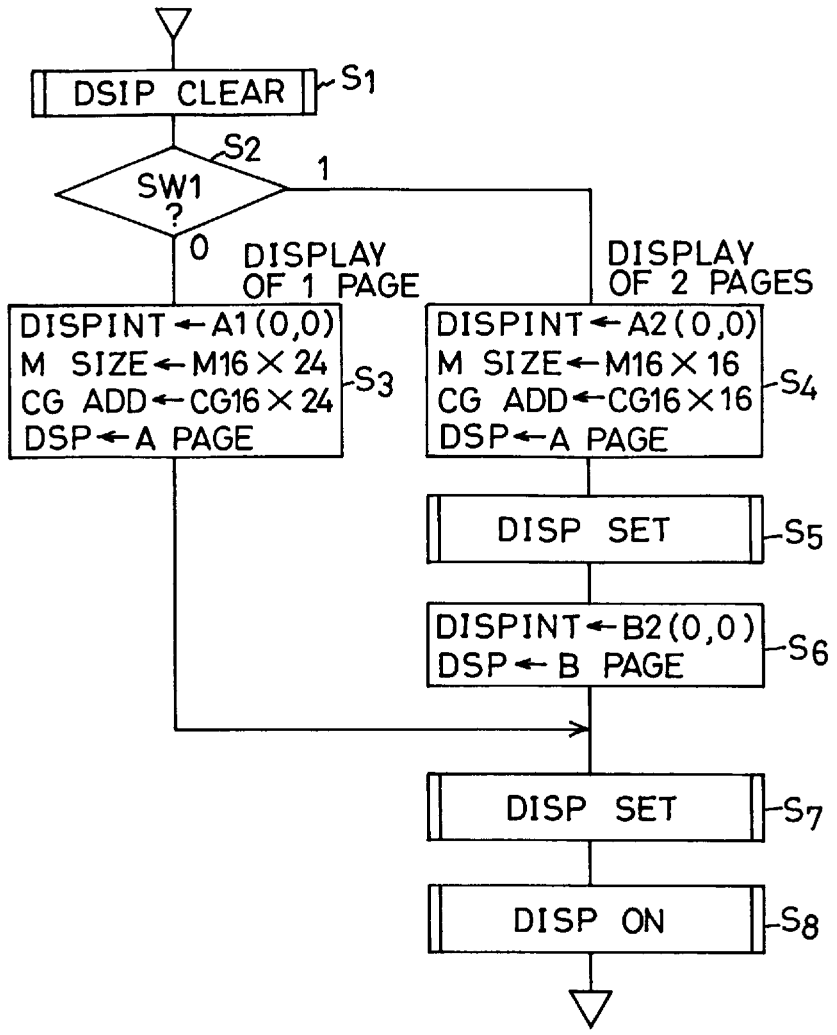
FIG. 7 is a flow chart for describing a display operation of the FM multiplex broadcasting receiver of FIG. 6.

An operation of FM multiplex broadcasting receiver of the above structure will be described hereinafter with reference to the flow chart of FIG. 7. Referring to FIG. 7, at step S1, the display data is cleared, and the display screen of display unit 6 is cleared. At step S2, determination is made whether the logic of switch SW1 is 1 (H) or 0 (L). When the logic is 0, determination is made that display of one page is specified, and the program proceeds to step S3. When the logic is 1, determination is made that display of two pages is specified, and the program proceeds to step S4.

At step S3, a reference point A1 (0, 0) of the page A display is set for display reference point DISPINT, and M16×24 indicating the character size of 16×24 dots is set for display character size MSIZE. Also, CG16×24 indicating the display font data of 16×24 font stored in CGROM 4*a* is set for display character font address CGADD, and APAGE indicating page A is set for display page DSP. After these settings, the program proceeds to step S7.

At step S4 in which the logic of switch SW1 is 1, A2 (0, 0) indicating the reference point of page A is set for display reference point DISPINT, M16×16 indicating the character size of 16×16 dots is set for display character size MSIZE, CG16×16 indicating the display font data of 16×16 font stored in CGROM 4*a* is set for display character font address CGADD, and APAGE indicating the display of page A is set for display page DSP.

At step S5, the display data is set according to the data set at step S4. At step S6, reference point B2 (0, 0) of a page B display is set for display reference point DISPINT, and BPAGE indicating display of page B is set for display page DSP. At step S7, display data is set according to the data set at step S3 or S6. Finally at step S8, display unit 6 displays a predetermined screen according to the set display data.

According to the logic of switch SW1, one page of data is displayed using the display font data of 16×24 font, and two pages of data are displayed using the display font data of 16×16 font.

Figure 6:
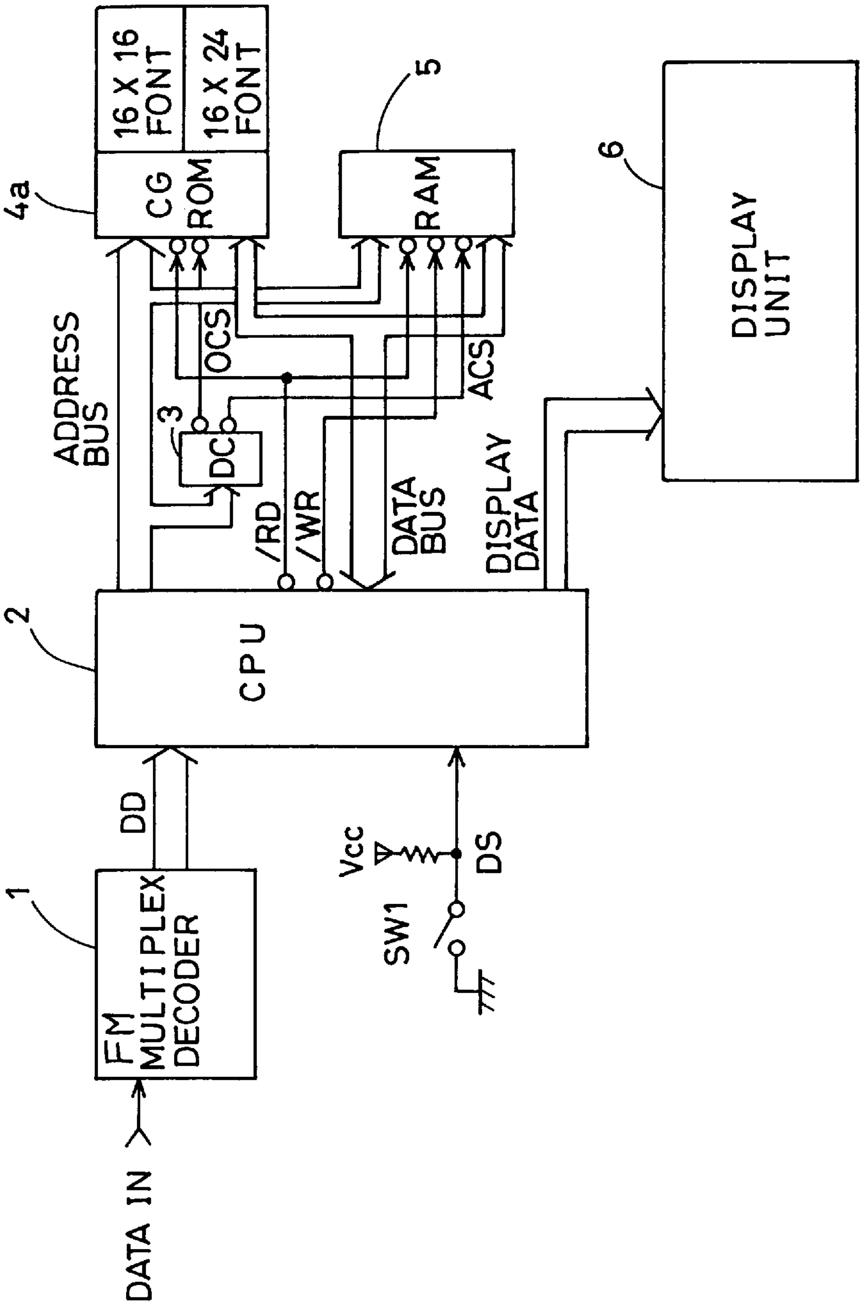
FIG. 6 is a block diagram showing a structure of an FM multiplex broadcasting receiver according to a second embodiment of the present invention.
Figure 8:
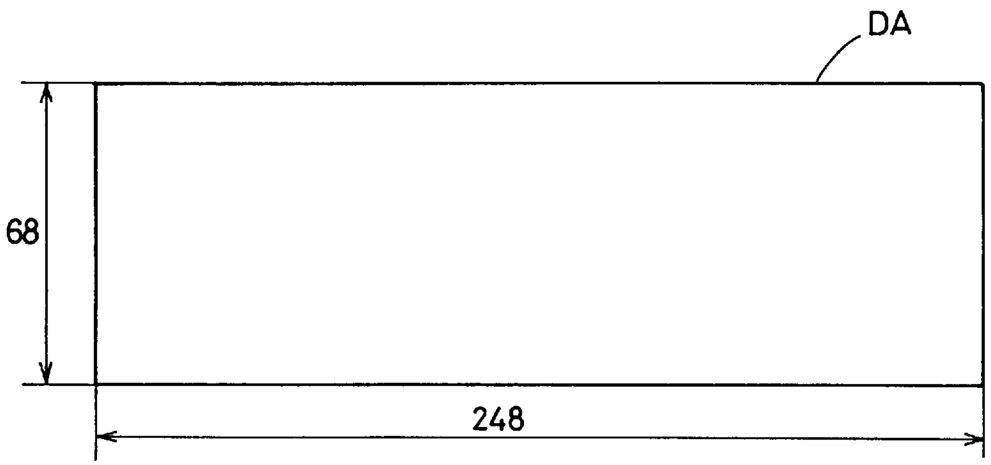
FIG. 8 shows a display region of the display unit of FIG. 6.
Figure 9:
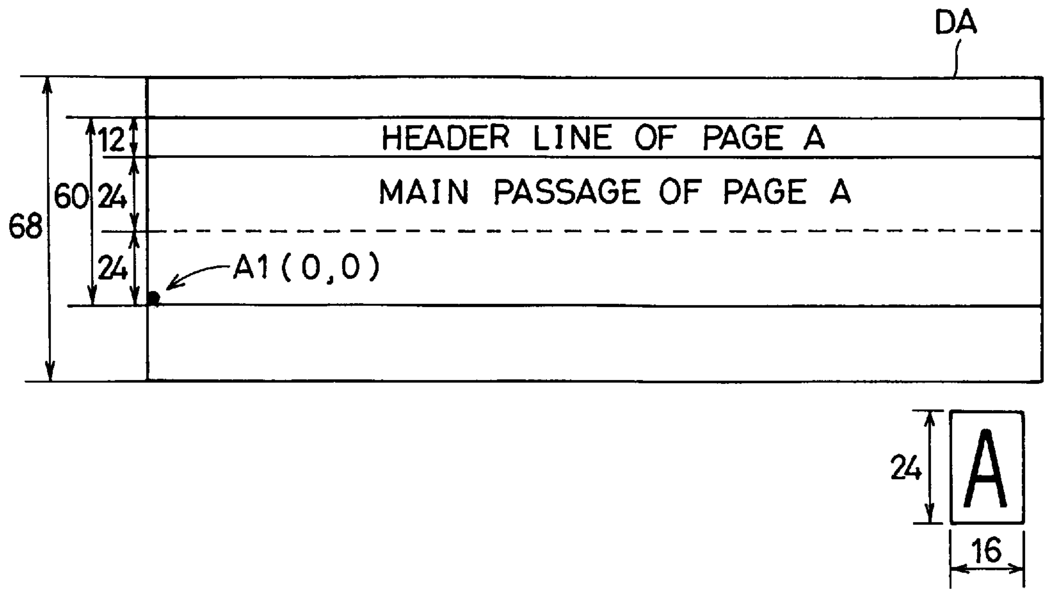
FIG. 9 shows an example of a display of one page of data by the display process in FIG. 7.

FIG. 8 shows an example of display region of display unit 6 of FIG. 6. Display region DA shown in FIG. 8 has an area of 248×68 dots. FIG. 9 shows display of one page of data according to the display region of FIG. 8. The header line of page A is displayed with a width of 12 dots from the fifth dot from the top. Two lines of the main passage of page A, each line taking a width of 24 dots, are displayed right below the header line. Reference point A1 (0, 0) of the page A display set at step S3 in FIG. 7 is the left bottom point of the main passage of page A. Accordingly, the header line and the main passage of one page can be displayed substantially at the middle of display region DA as shown in FIG. 9.

Figure 10:
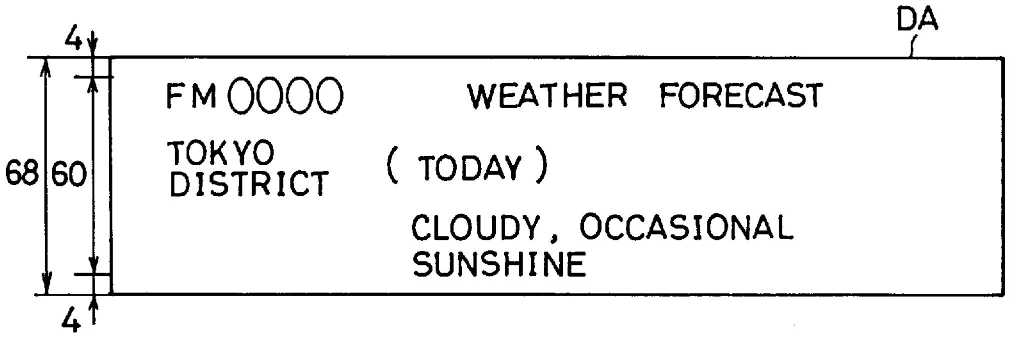
FIG. 10 shows a specific display example of FIG. 9.

FIG. 10 shows a specific example of FIG. 9. The header line of "FM ○○○○ Weather Forecast" and the main passage of "Tokyo district (today) cloudy, occasional sunshine" are displayed at the center region of 60 dots of display region DA that has a vertical length of 68 dots. In order to utilize display region DA efficiently, each text is displayed by the display font data of 16×24 font which is the greater size. Visual confirmation is facilitated for the user.

Figure 11:
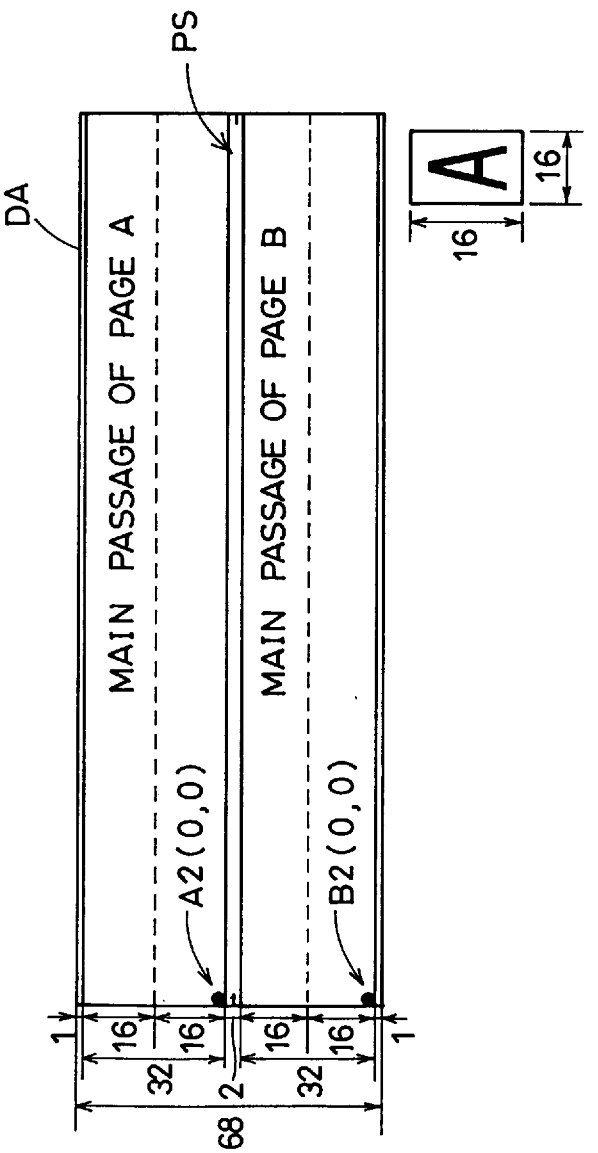
FIG. 11 shows a display of 2 pages of data according to the display process of FIG. 7.

Display of two pages will be described hereinafter with reference to FIGS. 11 and 12. Referring to FIG. 11 according to display region DA of FIG. 8, the main passage of page A including 2 lines is displayed with a width of 16 dots for each line occupying 32 dots from the second uppermost dot. The main passage of page B occupying 32 dots is similarly displayed with a space of 2 dots from the main passage of page A. Here, a blank is provided at the space between the main passages of pages A and B as a partition. Reference point A2 (0, 0) of the page A display set at step S4 in FIG. 7 indicates the left bottom point of the main passage of page A, and reference point B2 (0, 0) of the page B display indicates the left bottom point of the main passage of page B. Display of the header line for each page is omitted in the display of FIG. 11 in order to display two pages of data occupying the width of 68 dots. This is because it is not required to display the header line repeatedly since there is no change in the information of the header line once a program is selected. It is therefore possible to display more data in a limited display region.

Figure 12:
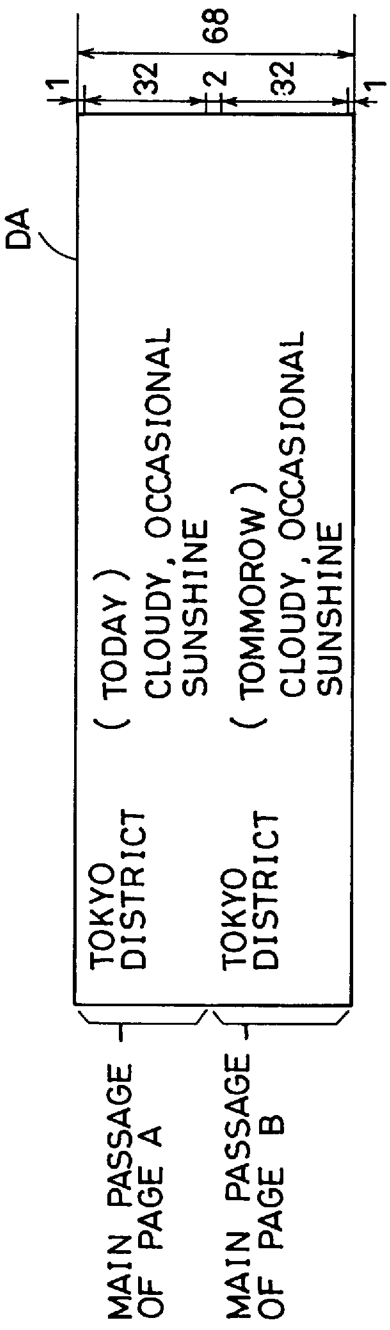
FIG. 12 shows a specific example of a display of FIG. 11.

As shown in FIG. 12, the main passage of page A "Tokyo district (today) cloudy, occasional sunshine", is displayed at the upper portion of display region DA, and the main passage of "Tokyo district (tomorrow) cloudy, occasional sunshine" of page B is displayed at the lower portion. In order to utilize display region DA efficiently and display more information, display font data of the display character size of 16×16 font is used. Therefore, the user can confirm information of two pages at one time. The switching operation of the page is reduced in comparison with the case where each page is displayed alone. Thus, the operability of the apparatus is improved.

Figure 13:
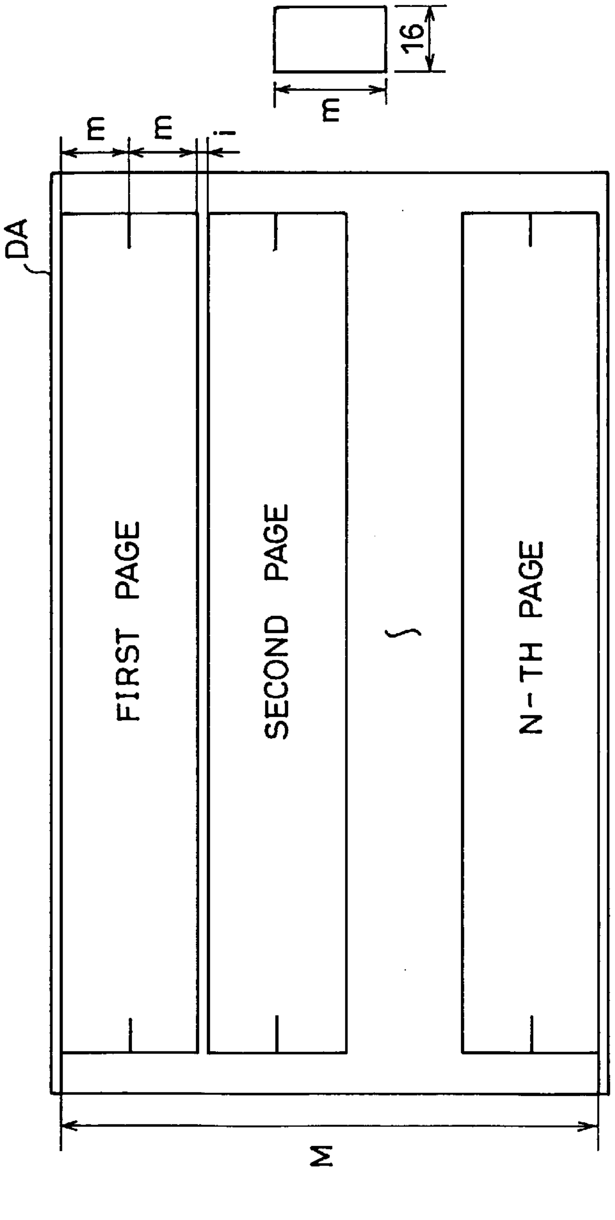
FIG. 13 is a diagram for describing a selection process of a character font and a process for determining whether or not to display a header.

In contrast to the above-described second embodiment in which two pages of information are displayed, selection of a display font and the determination procedure of whether to display or not a header line in the case of displaying an arbitrary number, for example n, pages of data will be described hereinafter with reference to FIG. 13.

When only the main passages of n pages are to be displayed without the header line of each page with the smallest display character size (16×m dots) and with a space of i dots between pages, the total number of vertical dots of M in display region DA of display unit 6 is $M=2\times m\times n+i(n-1)$. In selection of a character font and determination of whether or not to display a header line, it is assumed that since the space between pages is sufficiently smaller than the number of vertical dots of the main passage, the space between pages is omitted and the number of vertical dots in display region DA is 2×m×n in the following description.

The process of determining whether or not to display a header line in displaying $n_1$ pages will first be described. In displaying $n_1$ ($n>n_1$) pages with display region DA of 248×(2m×n), the number of vertical dots per page is $2\times m\times n/n_1$. A header line can be displayed when the value of the number of vertical dots per page minus the number of vertical dots for 2 lines (2×m) is greater than the number of vertical dots of a header line (0.5 line: m/2 dots) in the display of $n_1$ pages. Therefore, the condition for allowing display of a header line in $n_1$ pages is:

$$2\times m\times n/n_1-2\times m\geqq m/2$$

Therefore, not only the main passages of $n_1$ pages, but also a header line can be displayed at the same time when the above relationship is satisfied.

The process of selecting a character font in displaying the data of $n_1$pages will be described hereinafter. When a display region DA of 248×(2×m×n) is employed, the number of vertical dots per page in displaying $n_1$ pages ($n>n_1$) is $2\times m\times n/n_1$. Therefore, when a header is not displayed, the available character font of $16\times m_1$ ($m<m_1$) can be increased in size when the number of vertical dots of $2\times m_1$ for two lines with respect to the total number of vertical dots per page is small. Therefore, the condition for selecting the character font for $n_1$ pages is:

$$2\times m\times n/n_1\geqq 2\times m_1$$

Therefore, the text can be displayed increased in size with a $16\times m_1$ character font when the above condition is satisfied.

The criterion for increasing the character font and displaying a header line will be described hereinafter. In display region DA of 248×(2×m×n), the total number of vertical dots per page is $2\times m\times n/n_1$ when $n_1$ pages is to be displayed. Increase of the character font ($16\times m_1$:$m<m_1$) and display of a header line are allowed when the total number of lines for the header line and the main passage is 2.5 lines and when the number of vertical dots per page is greater than $2.5\times m_1$ dots for 2.5 lines. Therefore, the condition for increasing the character font and displaying a header line in displaying $n_1$pages is:

$$2\times m\times n/n_1\geqq 2.5\times m_1$$

Therefore, the character font can be increased and a header line displayed when the above condition is satisfied.

By determining each condition according to the above-described process, a plurality of pages can be displayed utilizing the display region effectively. In other words, display according to increase in the character font and display of a header line can be carried out in optimum.

Figure 14:
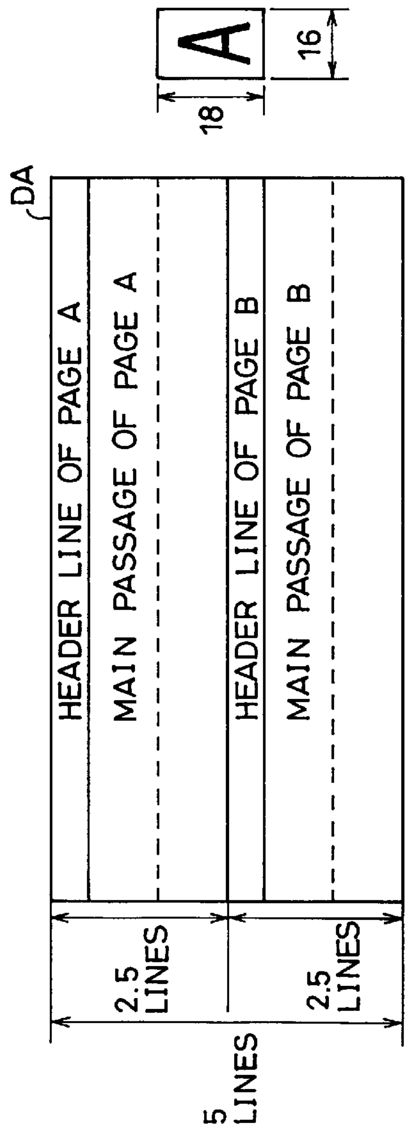
FIG. 14 shows an example of display of two pages of data including a header.
Figure 15A:
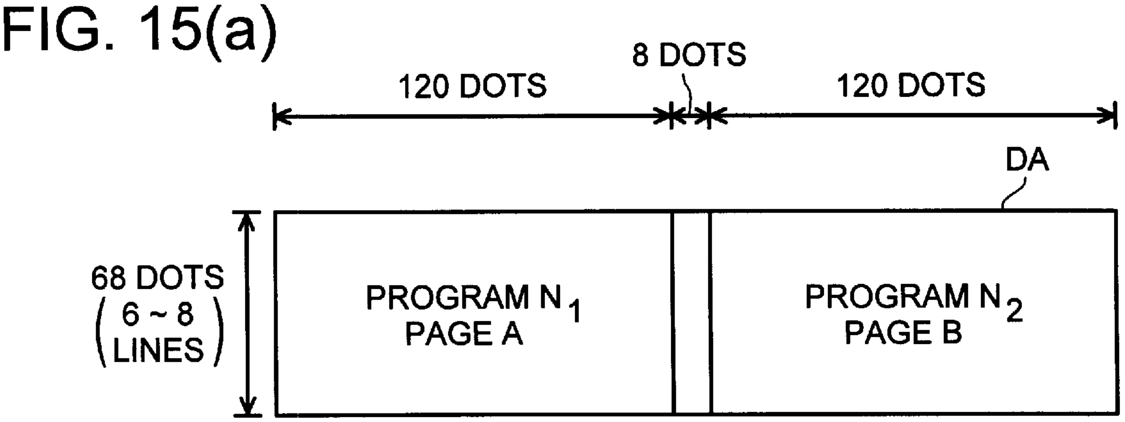
FIGS. 15(*a*) to 15(*d*) illustrate an example for switching the display including two programs differing in display format.
Figure 15B:
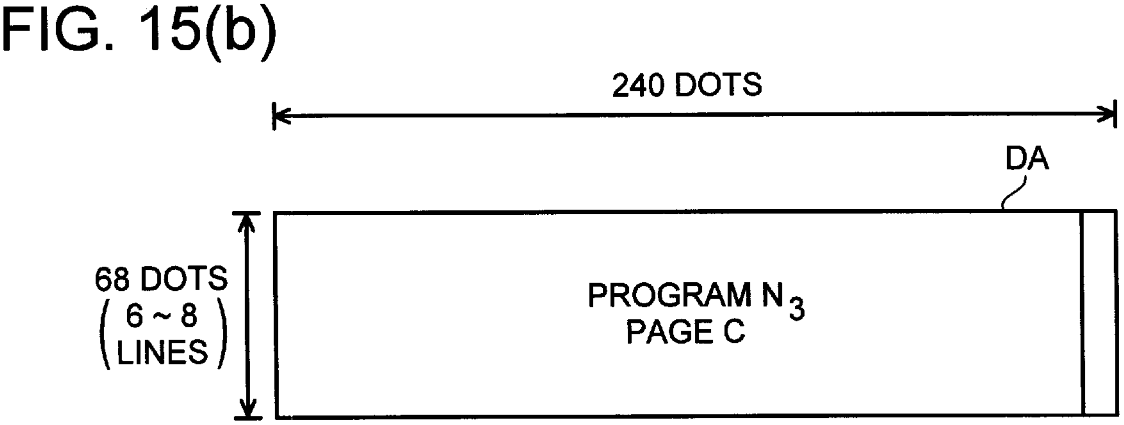
Figure 15C:
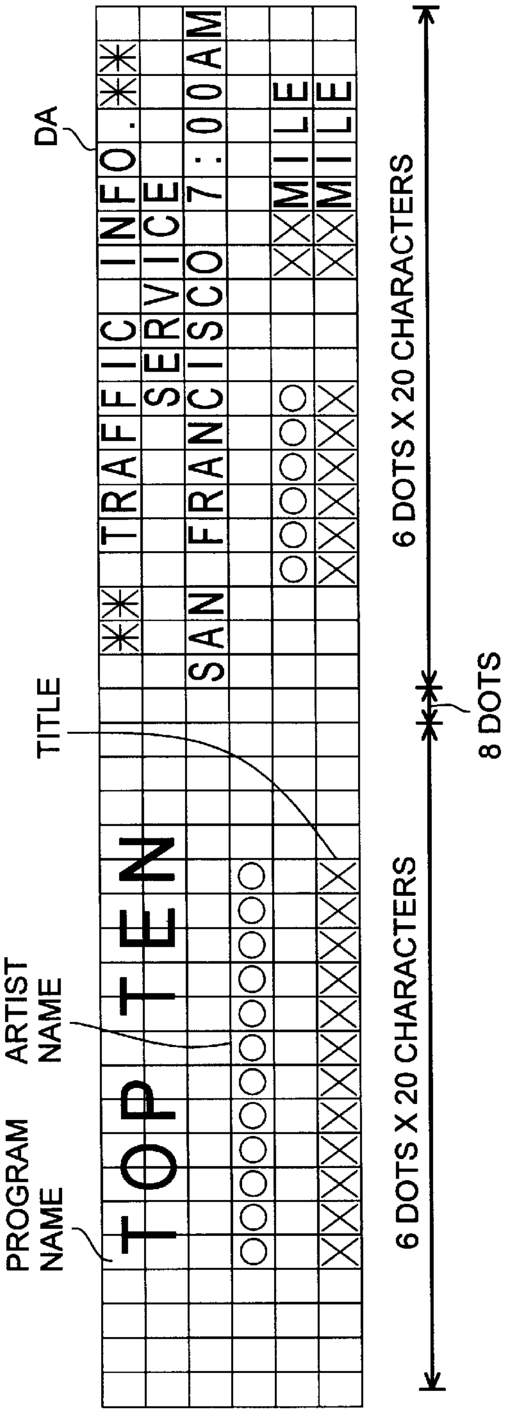
Figure 15D:
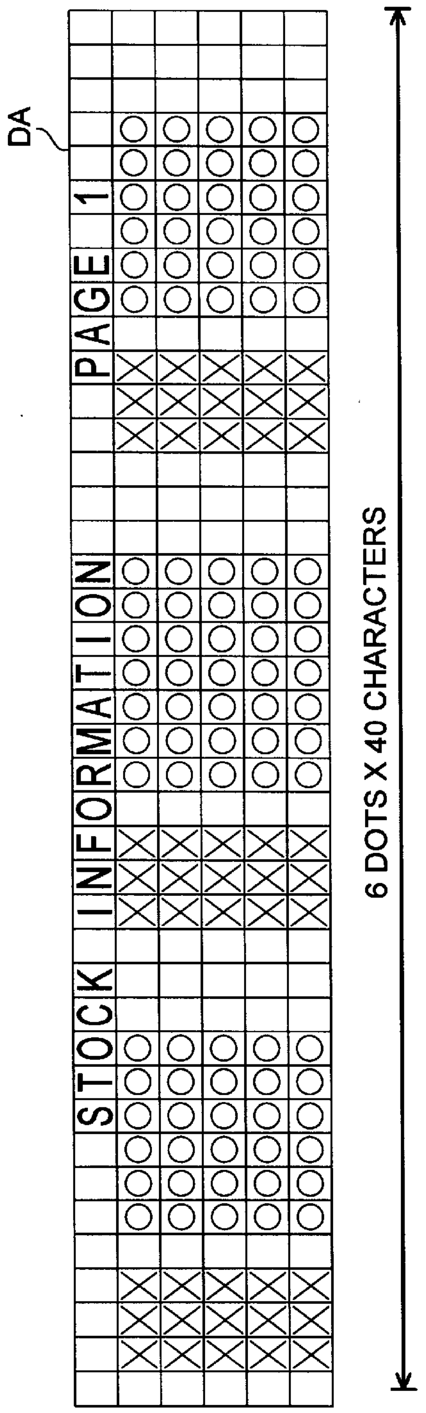

Another example of display for a plurality of pages will be described hereinafter with reference to FIGS. 14 and 15(*a*)–15(*d*). FIG. 14 shows display of a main passage including a header with a display frame of 16×18 dots. In this case, a region of 5 lines is required to display data of 2 pages, and the total number of vertical dots in the display region is 90 dots. FIGS. 15(*a*) –15(*d*) show examples display in the case of switching the display for two programs differing in the display format. There are two types of display formats, i.e. 120 dots×6~8 lines and 240 dots×6~8 lines in FIGS. 15(*a*)–15(*d*). The former is designated as display format FA, and the latter as format FB. When a program or page of format FB is received, the display screen is automatically switched from FIG. 15(*a*) to FIG.(*b*). This switching can be carried out not automatically, but manually, in which the user selects display switching. In FIG.(*a*), a sequentially complementary program $N_1$ of page A and a storage information program $N_2$ of page B are constantly displayed at the left side and right side, respectively, of the screen. When page C of a program $N_3$ of format FB is received or selected, the display screen switches from FIG. 15(*a*) to FIG. 15(*b*). Since format FB is generally employed in a charged program for all the pages of a particular program, the above-described automatic switching of display is of no problem to the user. In FIGS. 15(*c*) and 15(*d*) show specific examples of the display of FIGS. 15(*a*) and 15(*b*), respectively.

Figure 16:
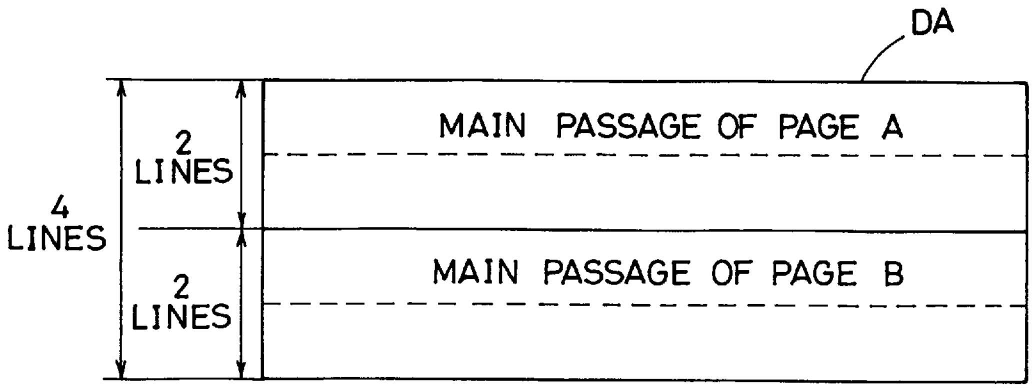
FIG. 16 shows an example of displaying two pages of data without a header.

A display in which a header line and the space between pages are omitted will be described hereinafter with reference to FIG. 16. In FIG. 16, a region of 4 lines is used to display data of 2 pages. When the character display frame is 16×18 dots, the total number of vertical dots is 72 dots.

Figure 17:
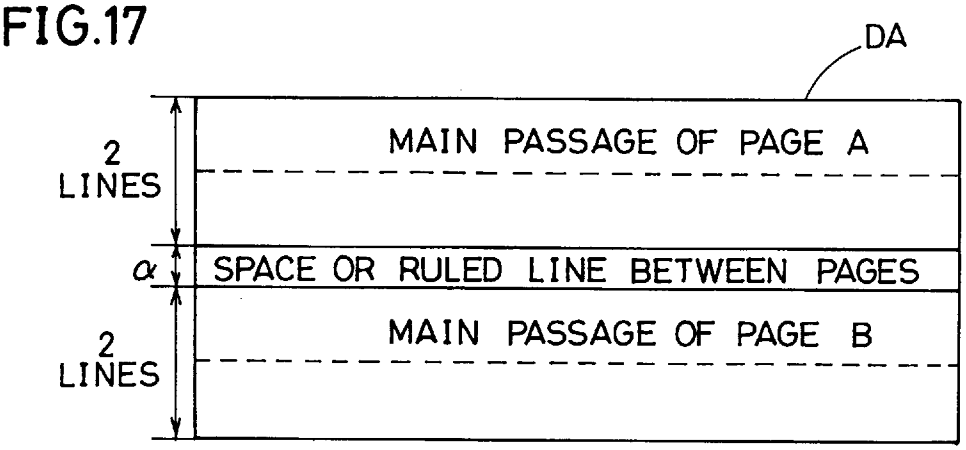
FIG. 17 shows an example of separating and displaying each page when a plurality of pages are to be displayed.

An example of displaying a plurality of pages with each page separated will be described with reference to FIG. 17. In FIG. 17, two lines of data of the main passage are displayed for each page, and a region of a dots for the space between pages or for a ruled line between pages is provided. Visual confirmation of the partition of each page can be improved since each page is separated by a space or a ruled line.

Figure 18:
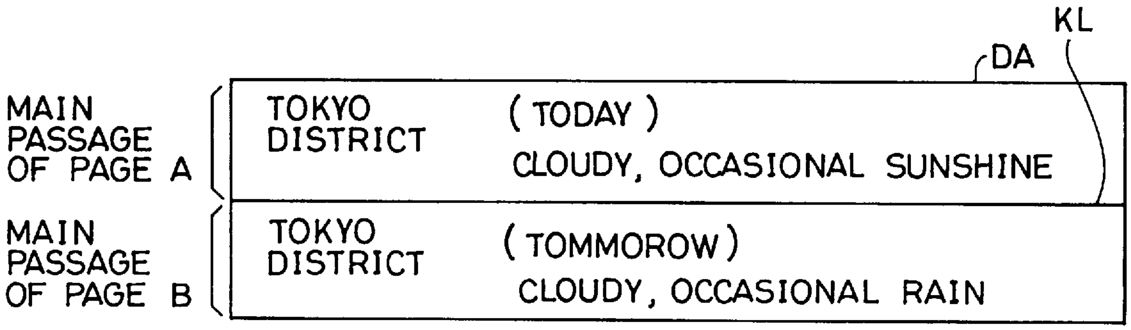
FIG. 18 shows a specific example of separating and displaying each page using a ruled line.

FIG. 18 shows a specific example of the display of FIG. 17 with each page separated using a ruled line. Ruled line KL is displayed between the main passage of page A and the main passage of page B to facilitate the view of each page. Although a display of 2 pages is described for the above display, the same can be applied to obtain similar effects for displays of three or more pages.

Figure 19:
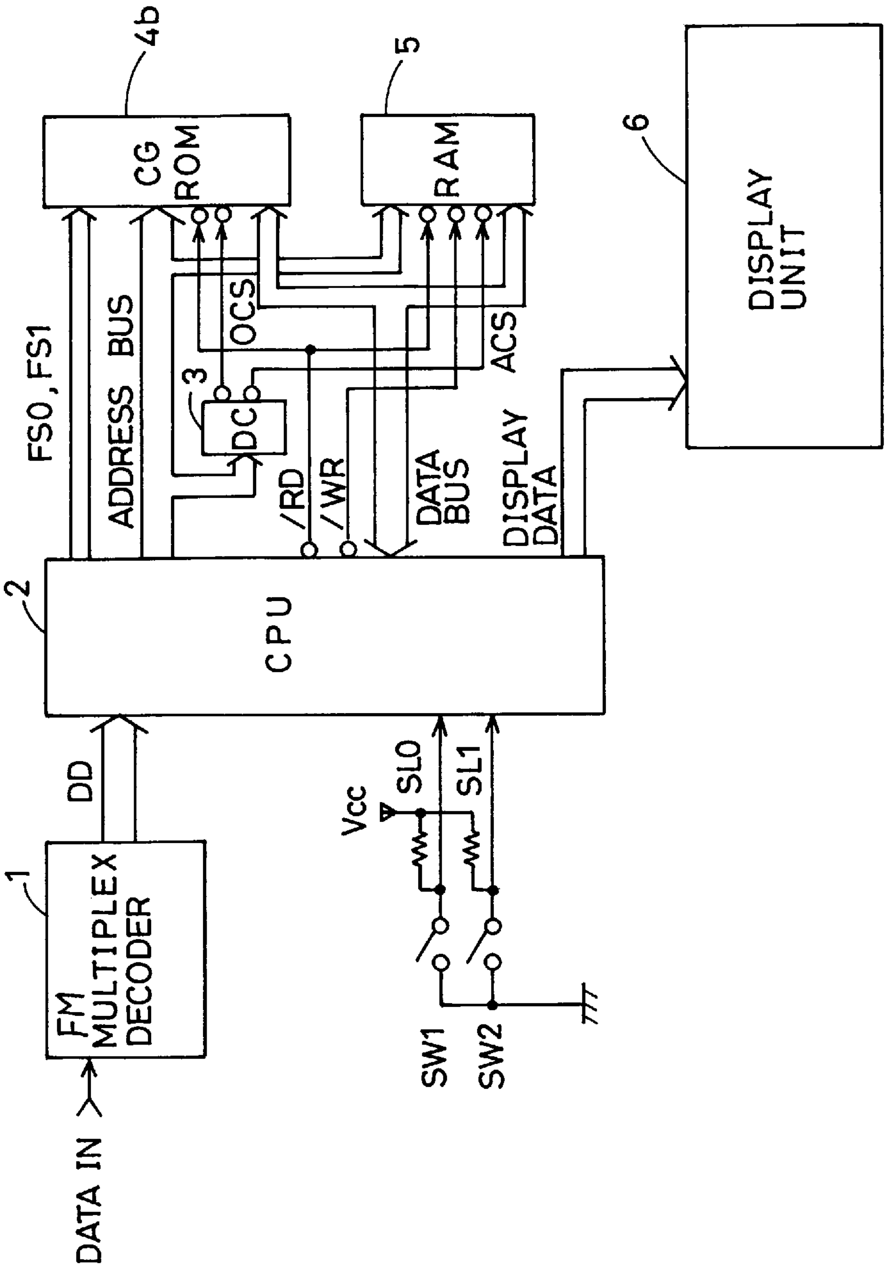
FIG. 19 is a block diagram showing a structure of an FM multiplex broadcasting receiver according to a third embodiment of the present invention.

An FM multiplex broadcasting receiver according to a third embodiment of the present invention will be described with reference to FIG. 19. The FM multiplex broadcasting receiver of FIG. 19 differs from that of FIG. 1 in the following points. A switch SW2 is added, and four types of display can be selected. Four types of display font data are stored in a CGROM 4*b*. Also, font select signals FS0 and FS1 are directly provided to CGROM 4*b* from CPU 2 without passing through an address bus. The remaining elements are similar to those of the FM multiplex broadcasting receiver shown in FIG. 1, and detailed description thereof will not be repeated.

In the third embodiment, the address of CGROM 4*b* is directly modified by font select signals FS0 and FS1, similar to bank switching, so that CPU 2 can switch the font data while specifying the same address. The display character font and the display layout can be changed without modifying the program.

Figure 20:
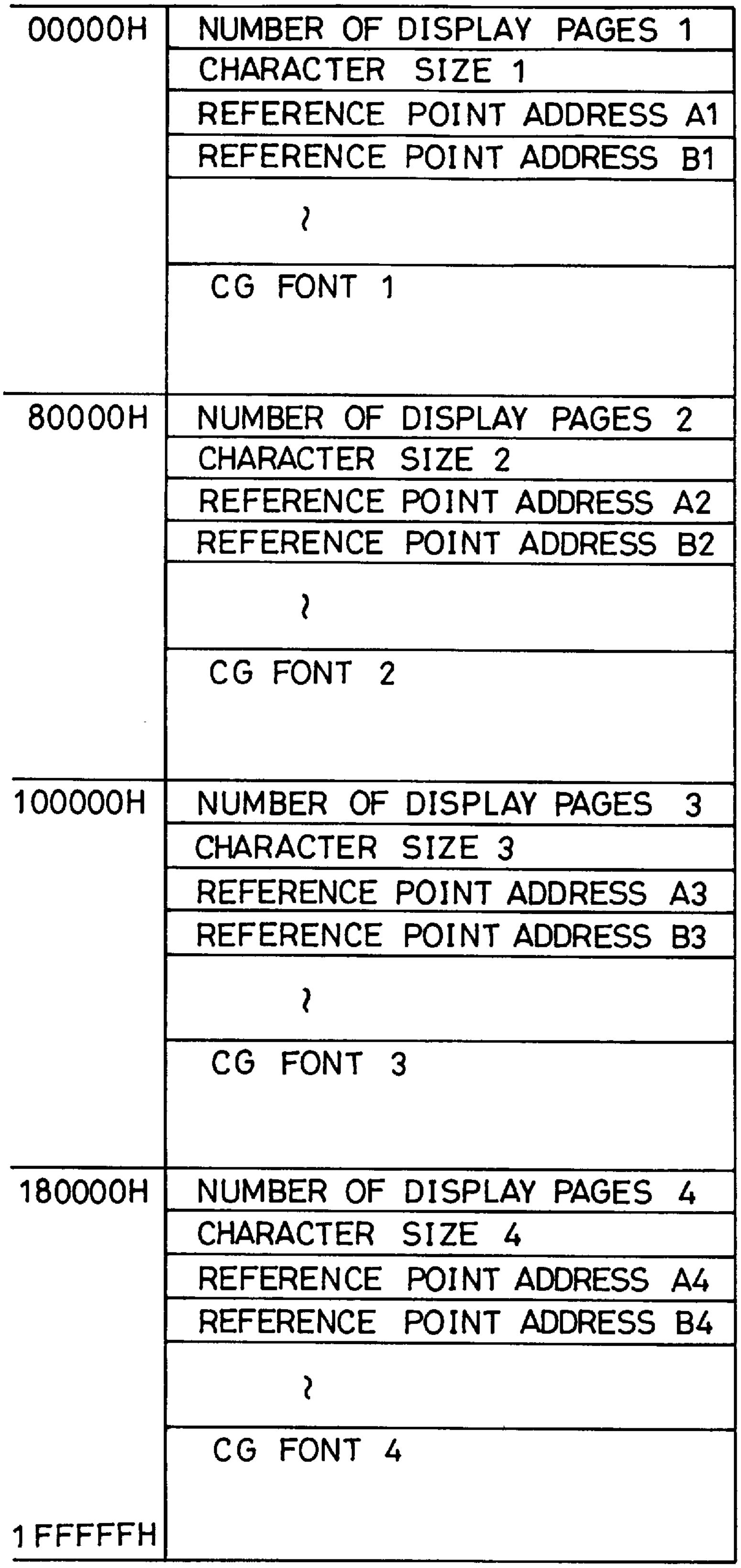
FIG. 20 shows a data map of a CGROM.

A data map of display font data stored in CGROM 4*b* will be described with reference to FIG. 20. First display font data is stored from address 00000H. Second display font data is stored from address 80000H. Third display font data is stored from address 100000H. Fourth display font data is stored from address 180000H. For example, the number of pages to be displayed, the character size, the reference point address, and display font data (CG font) are stored in each display font data. The display layout and the character font are determined by these data.

Figures 21, 22:
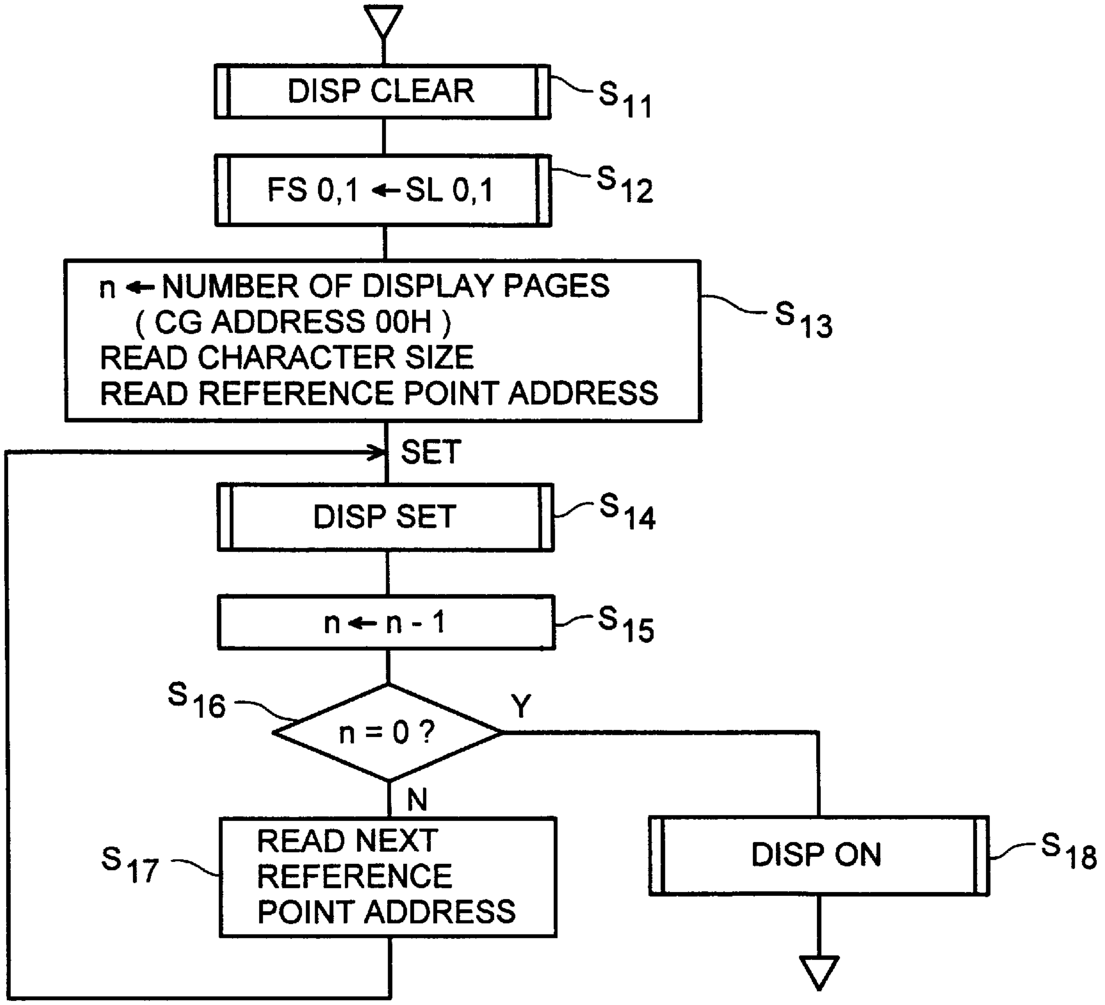
FIG. 21 shows the relationship between font select signals and an CGROM address.
FIG. 22 is a flow chart for describing a display operation of the FM multiplex broadcasting receiver of FIG. 18.

The relationship between font select signals FS0 and FS1 and the address of CGROM will be described with reference to FIG. 21. In a state where switch SW2 is ON, and font select signal FS1 attains 0, and SW1 is ON, and font select signal FSO is 0, the display font data corresponds to addresses 8000H~FFFFFH correspond to of CGROM 4*b*. Addresses 800H~FFFFFH correspond to font select signal FS1 attaining 0 and font select signal FS0 attaining 1. Addresses 100000H~17FFFFH correspond to font select signal FS1 attaining 1 and font select signal FS0 attaining 0. Addresses 180000H~1FFFFH correspond to font select signals FS1 and FS0 both attaining 1.

More specifically, font select signal FS0 is applied to the high order address A19 of CGROM 4*b*, and font select signal FS1 is applied to high order address A20. Therefore, a high order addresses A19 and A20 are switched automatically according to the logic of switches SW1 and SW2. CPU 2 only has to output a predetermined address signal for low order addresses A18-A0, and the address signal provided from CPU 2 can be the same irrespective of the type of the display font data. The type of the display font data can be switched without modifying the program.

An operation of the above FM multiplex broadcasting receiver will be described hereinafter with reference to the flow chart of FIG. 22.

At step S11, the display data of display unit 6 is cleared. At step S12, output signals SL0 and SL1 of switches SW1 and SW2 are set as font select signals FS0 and FS1. Therefore, the set font select signals FS0 and FS1 are provided to the high order addresses A19 and A20 of CGROM 4*b*, whereby the high order addresses are set.

At step S13, the display number of pages of low order address 00H is set to n. Then, the character size and the reference point address are read. Since the address signal provided from CPU 2 to CGROM 4*b* is the same irrespective of the display font data type, four types of display font data are mapped at the same address space when viewed from CPU 2 by using the above-described font select signals. At step S14, display data is set according to the read data. At step S15, the number of display pages is set to n-1. At step S16, determination is made whether n is 0 or not. When n is not 0, the program proceeds to step S17, otherwise to step S18.

At step S17 in which n is not 0, the next reference point address is read, and the program proceeds to step S14 to continue the subsequent process. When n=0, determination is made that the setting of data for all the pages to be displayed is completed. The program proceeds to step S18 to provide a predetermined display according to the set display data.

Since the address space of CGROM 4*b* is identical when viewed from CPU 2 independent of the four types of display font data, data can be displayed according to the display font data specified automatically by switches SW1 and SW2 without modification of the software.

In the present embodiment, the logic obtained by reading output signals SL0 and SL1 of switches SW1 and SW2 from the input port of CPU 2 are provided as font select signals FS0 and FS1. However, font select signals FS0 and FS1 may be output by a latch circuit external to CPU 2. Alternatively, a similar effect can be obtained to output font select signals FS0 and FS1 by using only switch SW1 and ascertaining the output logic of font select signals FS0 and FS1 by software.

Figure 23:
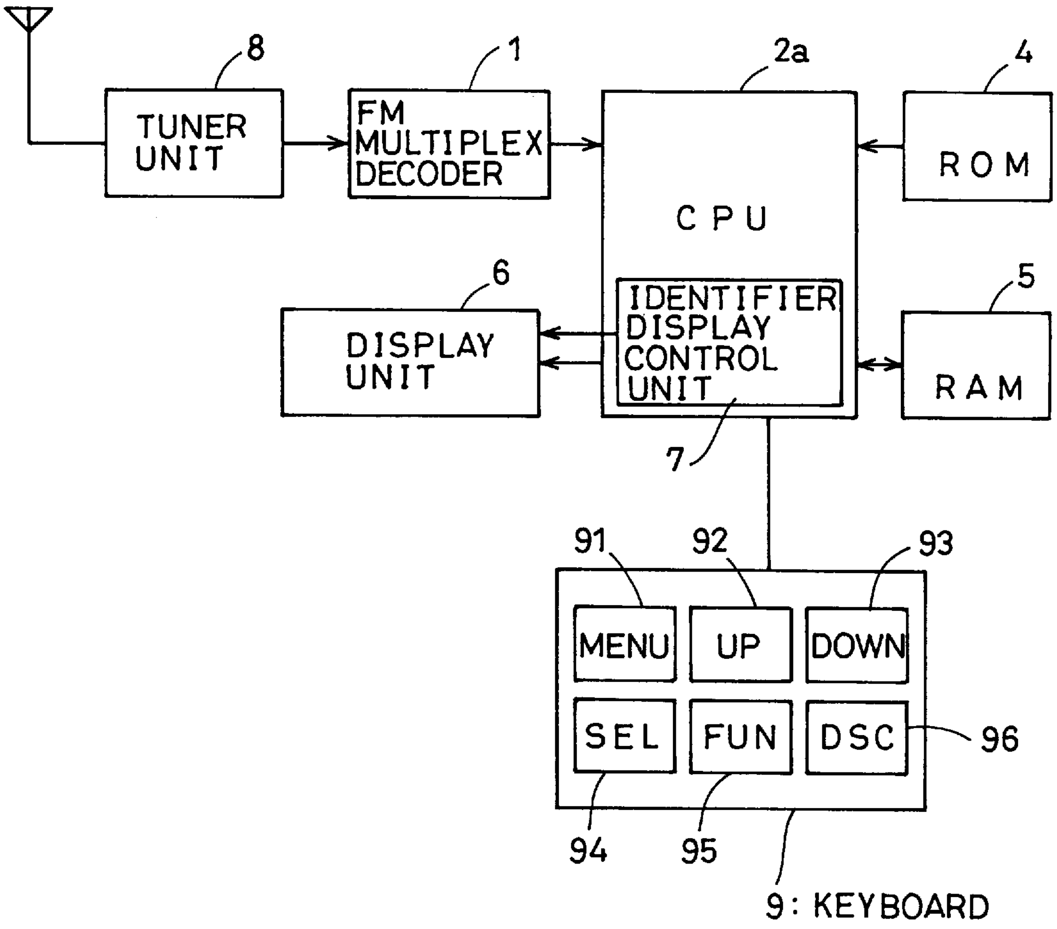
FIG. 23 is a block diagram showing a structure of an FM multiplex broadcasting receiver according to a fourth embodiment of the present invention.

An FM multiplex broadcasting receiver according to a fourth embodiment of the present invention will be described with reference to FIG. 23. The FM multiplex broadcasting receiver of the fourth embodiment is configured to easily recognize whether the information of each page is of a different program or of the same program when contents of information of a plurality of pages are displayed without the header of display format 0. Referring to FIG. 23, the FM multiplex broadcasting receiver includes a tuner unit 8 for receiving and detecting a wave from an FM broadcast station, an FM multiplex decoder 1 for decoding multiplex data from the detected output of tuner unit 8, a CPU 2*a* for effecting control to display multiplex data decoded by FM multiplex decoder 1, a ROM 4 in which font data for character display is stored, a RAM 5 for storing multiplex data decoded by FM multiplex decoder 1 and information for display, a display unit 6, and a keyboard 9. FM multiplex decoder 1, ROM 4, and display unit 6 are similar to those already described, and their description will not be repeated.

CPU 2*a* includes an identifier display control unit 7 for displaying an identifier such as a character or a symbol for identifying the type of information of the plurality of pages to be displayed on display unit 6. Here, it is assumed that display unit 6 has a display screen for displaying two pages of program information.

Keyboard 9 includes a menu key 91 operated to display various menus, an up key 92, a down key 93 and a selection key 94 operated using a cursor on display unit 6 to select a desired item from a plurality of items displayed on a menu, a function key 95 operated to specify each of a variety of functions, and a display switching key 96 operated to switch the display mode in display unit 6.

Figure 24:
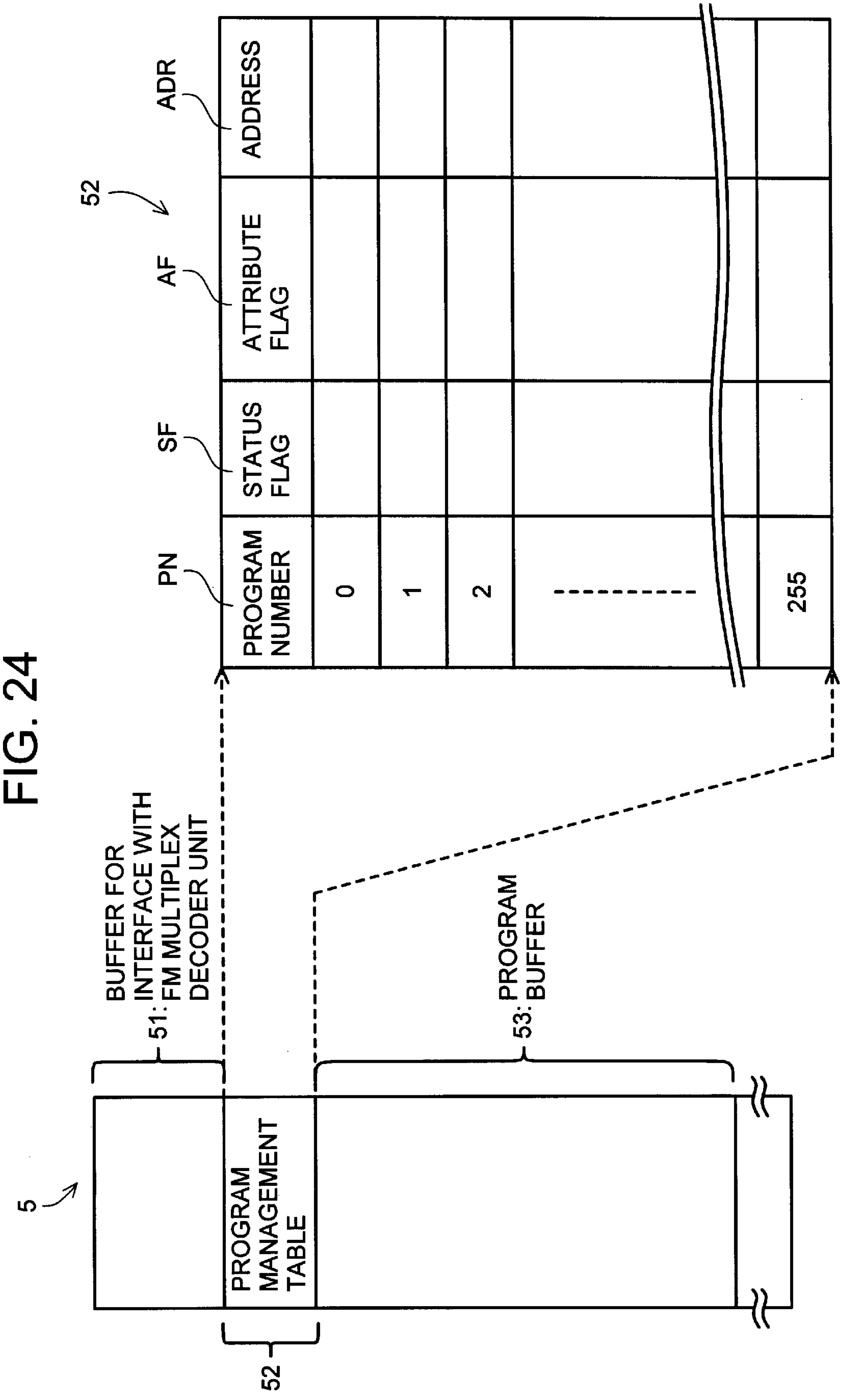
FIG. 24 shows a portion of stored contents in a RAM 5 of FIG. 23.

FIG. 24 shows a portion of the stored contents in RAM 5 of FIG. 23. RAM 5 includes a buffer 51 for interface with FM multiplex decoder 1, a program management table 52 for managing programs stored in RAM 5, and a program buffer 53 for storing programs.

Program management table 52 includes a program number PN allotted to identify each of the programs in program buffer 53, a status flag SF indicating completion of the corresponding program, i.e. indicating whether reception is completed or not, an attribute flag AF indicating whether the program is a one-time-display type in which display can be effected when all the pages of the corresponding program are available or of a non-one-time-display type in which display may be effected when one page is available, and an address ADR indicating the storage position in program buffer 53 of a corresponding program information. Therefore, CPU 2*a* can read out a desired program from program buffer 53 via program management table 52, and identify the state or attribute of a desired program.

Figure 25:
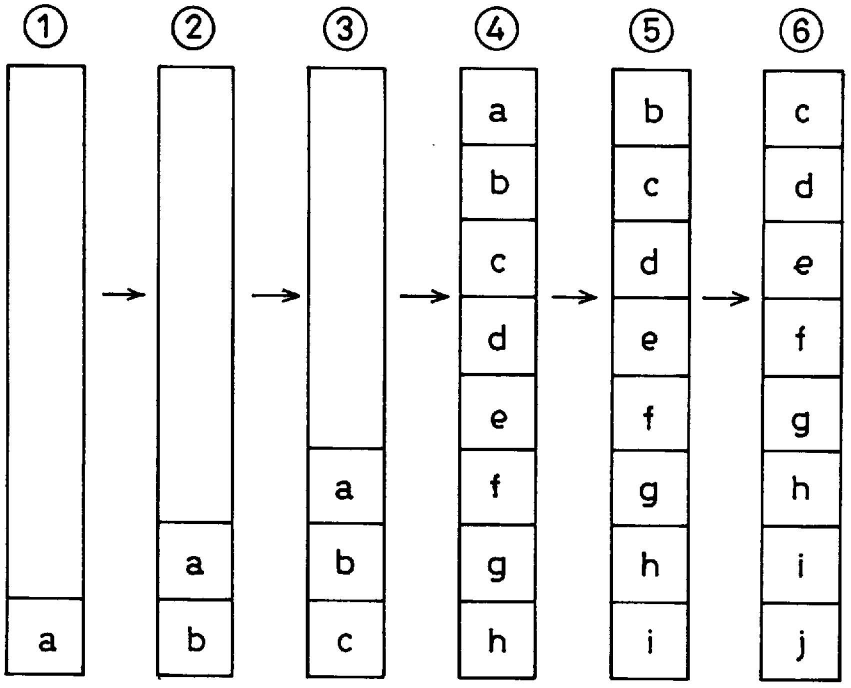
FIG. 25 is a diagram for describing a format of storage of programs in a program buffer 53 of FIG. 24.

FIG. 25 is a diagram for describing the storage format of programs in program buffer 53 of FIG. 24. Referring to FIG. 25, information of 8 pages, for example, is stored for each program in program buffer 53. Since the received information of each program is sequentially stored in a corresponding region in program buffer 53 according to an FIFO (First-In-First-Out) method in the order of (1)→(2)→ . . . (6), the latest page will always be stored in the last portion of each relevant region.

Figure 26A:
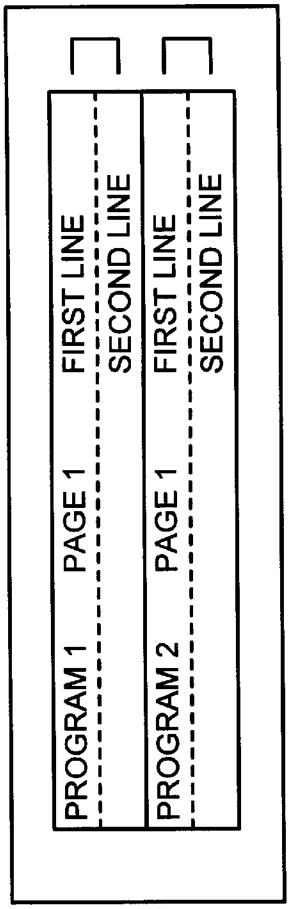
FIG. 26(*a*) to (*c*) show an example of a display according to the FM multiplex broadcasting receiver of the fourth embodiment.
Figure 26B:
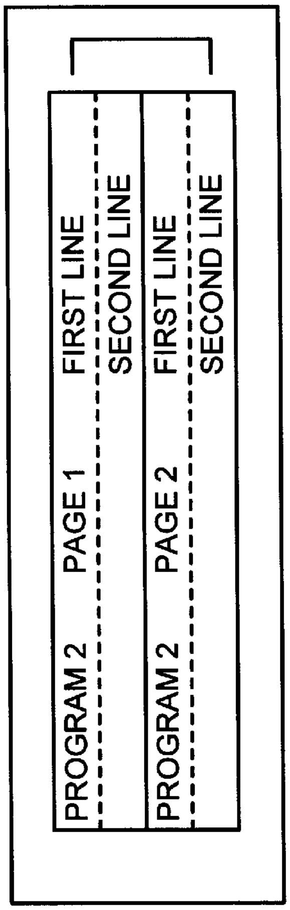
Figure 26C:
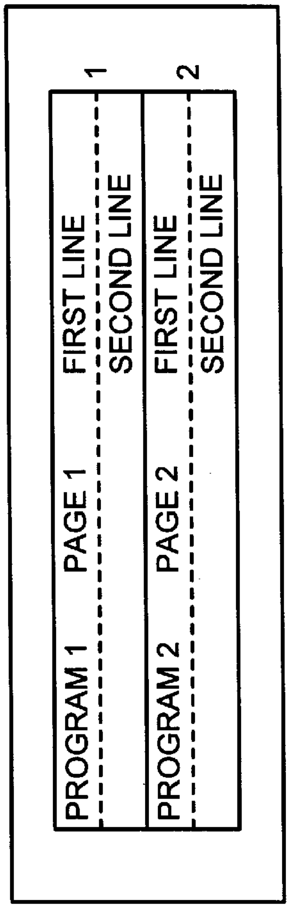

In displaying two pages of information by display unit 6, control is made whether to display two pages of information of the same program or one page of each of two different program information according to the manner of reading out information stored in RAM 5 by CPU 2*a*. FIGS. 26(*a*)–26(*c*) show examples of display by the FM multiplex broadcasting receiver according to the fourth embodiment of the present invention.

Here, it is assumed that display switch key 96 on keyboard 9 is operated by the user to select a function so as to display in an upper location and a lower location each page of two different program information by display unit 6. In this case, CPU 2*a* reads out and displays on display unit 6 the latest page of the selected two programs from RAM 5 since the user has selected two desired programs from a list of programs obtained by operating menu key 91. Here, a symbol is generated to indicate that the two pages are of different programs by identifier display control unit 7. The generated symbol is added to each page and displayed in display unit 6. In FIG. 26 (*a*), a symbol of ] for example, is added at the right side of each page to indicate that each page is of a different program.

When two pages of information of the same program are displayed in the upper and lower locations in display unit 6, a symbol bridging entirely across the two pages is added at the right side of display unit 6 as shown in FIG. 26 (*b*). By generating and applying an identifier corresponding to a display page by identifier display control unit 7 with respect to the information displayed in display unit 6, identification is facilitated of whether two pages of information of the same program are displayed or one page of each of two different programs are displayed. Although a symbol of ] is displayed at the right side of display unit 6 in the present embodiment, the location of the identifier is arbitrary as long as one page can be easily identified. Furthermore, the identifier to be displayed is not limited to ], and the symbol for each page does not have to be the same.

Another example is shown in FIG. 26(*c*). By displaying the program number PN applied for each program in each page, identification is facilitated whether two pages of information of the same program or one page of two different program information are displayed. Also, the identifier does not have to be the program number PN applied to the program. The initial of a program obtained in selection of a program menu, for example, can be used as long as identification of the same program or a different program can be made.

Figure 27A:
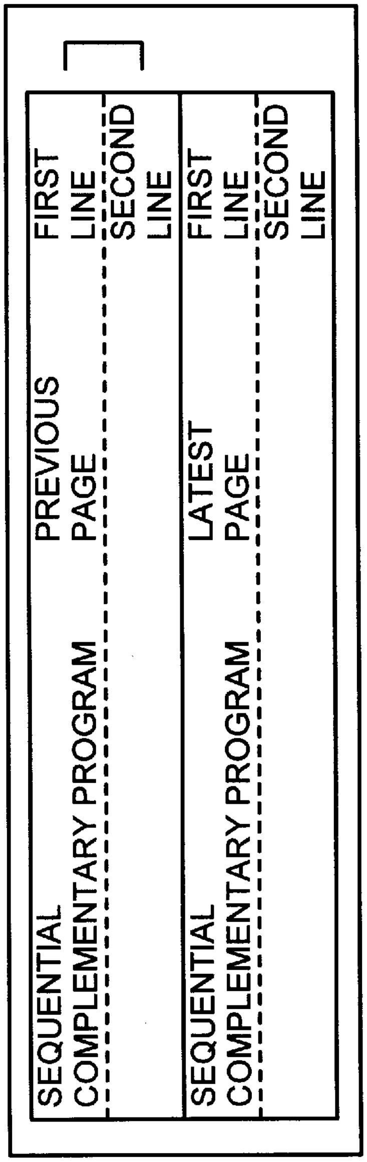
FIG. 27(*a*) and (*b*) show another example of a display by the FM multiplex broadcasting receiver of the fourth embodiment.
Figure 27B:
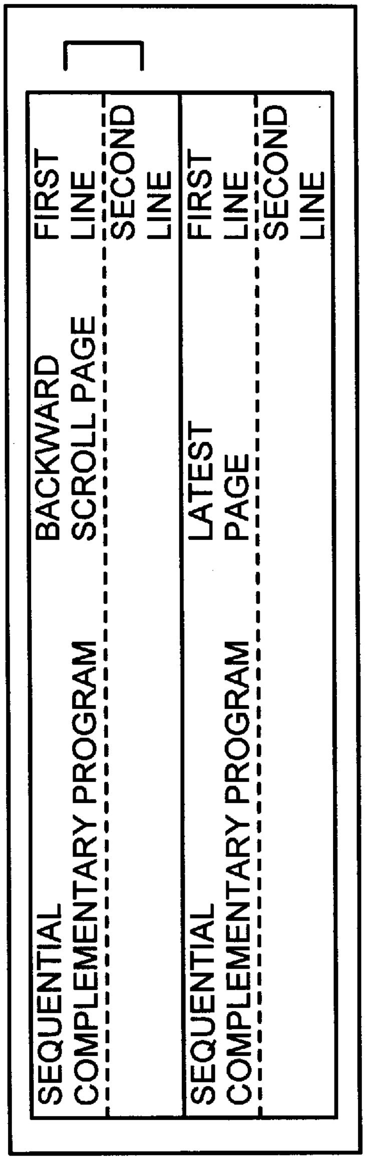

A sequential complementary program of display format 0 can be displayed on display unit 6 for a plurality of pages according to the operation of display switching key 96. FIGS. 27(*a*) and 27(*b*) show examples of another display by the FM multiplex broadcasting receiver according to the fourth embodiment.

As to the information of a sequential complementary program stored in RAM 5, a desired previous information can be read out by CPU 2*a* according to requirement to be displayed in display unit 6. In this case, information of the latest page and the next latest page of the sequential complementary program can be displayed at the lower portion and the upper portion, respectively, of display unit 6 as shown in FIG. 27(*a*). The display position may be interchanged, so that the latest information is displayed at the upper portion, and the last second to the information is displayed at the lower portion. Then, a symbol indicating that it is one previous information of a sequential complementary program is applied and displayed by identifier display control unit 7 at the right side of the upper page on display unit 6. Therefore, identification can be made that the information displayed at the relevant portion is an immediate previous one. In order to distinguish from the symbol displayed in FIG. 26(*a*), the symbol applied in this case may be a different symbol or the same symbol displayed in a blinking manner. Furthermore, the position of the symbol may be arbitrary as long as the upper page can be distinguished from the lower page.

Conventionally, in the case where only one page of information of display format 0 can be displayed and previous information is read out to be displayed (in the case of backward scrolling), the entire screen is filled up with the previous information, and the latest information could not generally be viewed. Since two pages of information can be displayed on display unit 6 according to the FM multiplex broadcasting receiver of the present embodiment, the latest information can always be viewed at the lower one page while displaying the backward scroll of previous information only at the upper one page as shown in FIG. 27(*b*) when scrolling is carried out from the state of display shown in FIG. 27(*a*). Thus, the latest information can be used at the lower one page while confirming previous information at the upper one page by backward scrolling.

Figure 28:
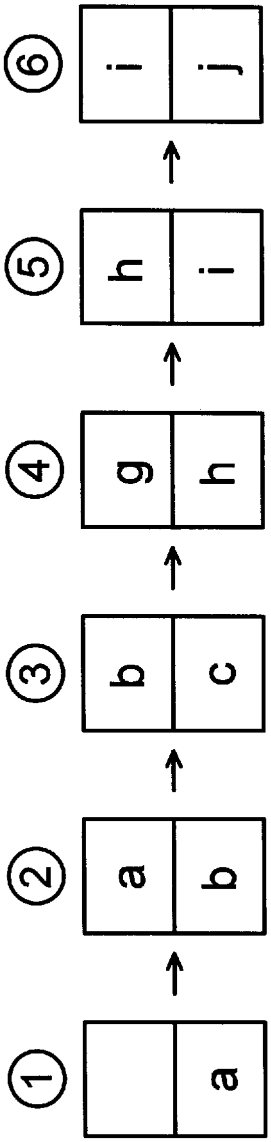
FIG. 28 shows a specific example according to FIG. 25 of the display example shown in FIG. 27.

FIG. 28 shows a specific example according to FIG. 25 of the display of FIGS. 27(*a*) and 27(*b*). Here, it is assumed that a certain sequential complementary program is stored in RAM 5 as shown in FIG. 25, wherein (1)–(6) of FIG. 25 correspond to (1)~(6) of FIG. 28. According to the display mode of FIG. 27(*a*), each page of the sequential complementary program of FIG. 25 is displayed as shown in FIG. 28.

When in the display state (6) of FIG. 28, the display of the upper page of display unit 6 is continuously altered as i→h→g→f→e→d→c when the user operates display switching key 96 of key board 9 and continuously operates up key 92 to request the display mode of FIG. 27(*b*). More specifically, only the upper page is displayed in a manner of backward scrolling. In the lower page, the latest page is displayed. When down key 93 is continuously operated instead of up key 92, the lower page of display unit 6 is altered as d→e→f→g→h→i→j (latest page).

Figure 29:
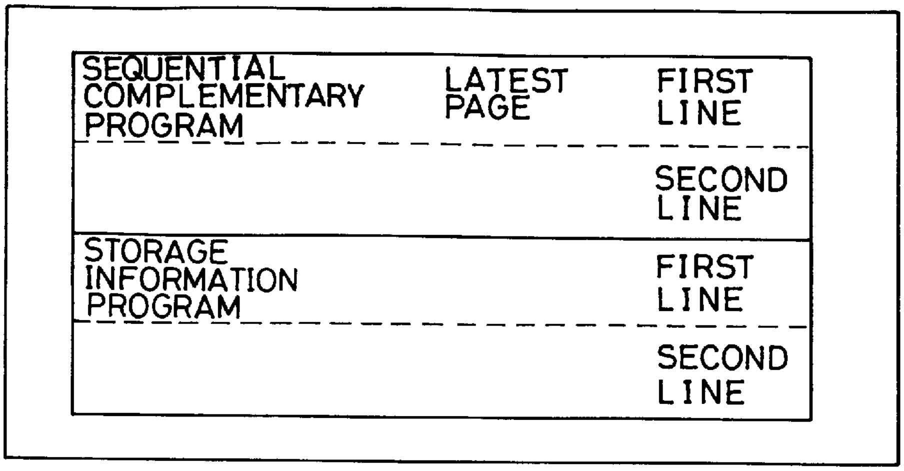
FIG. 29 shows a further example of a display of the FM multiplex broadcasting receiver of the fourth embodiment.

FIG. 29 shows a further example of display of the FM multiplex broadcasting receiver according to the fourth embodiment of the present invention. The FM multiplex broadcasting receiver can display each one page of two different programs on the same screen. In FIG. 29, a sequential complementary program and a storage information program are displayed at the upper page and the lower page, respectively, of display unit 6.

In an apparatus that can display only one page of information of format 0, a sequential complementary program cannot be viewed while viewing a storage information program. A storage information program is generally formed of a plurality of pages of information. By automatically effecting page advance for every constant time period, the most recent sequential complementary program can be viewed at the upper page while displaying storage information program at the lower page with page forwarding for every constant time period.

As storage information program, a plurality of programs such as news and weather forecast are broadcasted. Therefore, the above-described page forwarding is automatically carried out for every constant time period to automatically switch the program when arriving at the last page of each program. By effecting such a function by operating function key 95, for example, all the pages of all the programs can be displayed automatically in sequence without manual operation of program switching and page forwarding. Therefore, the user can enjoy programs even if he/she is a beginner without any complicated operation.

Figure 30:
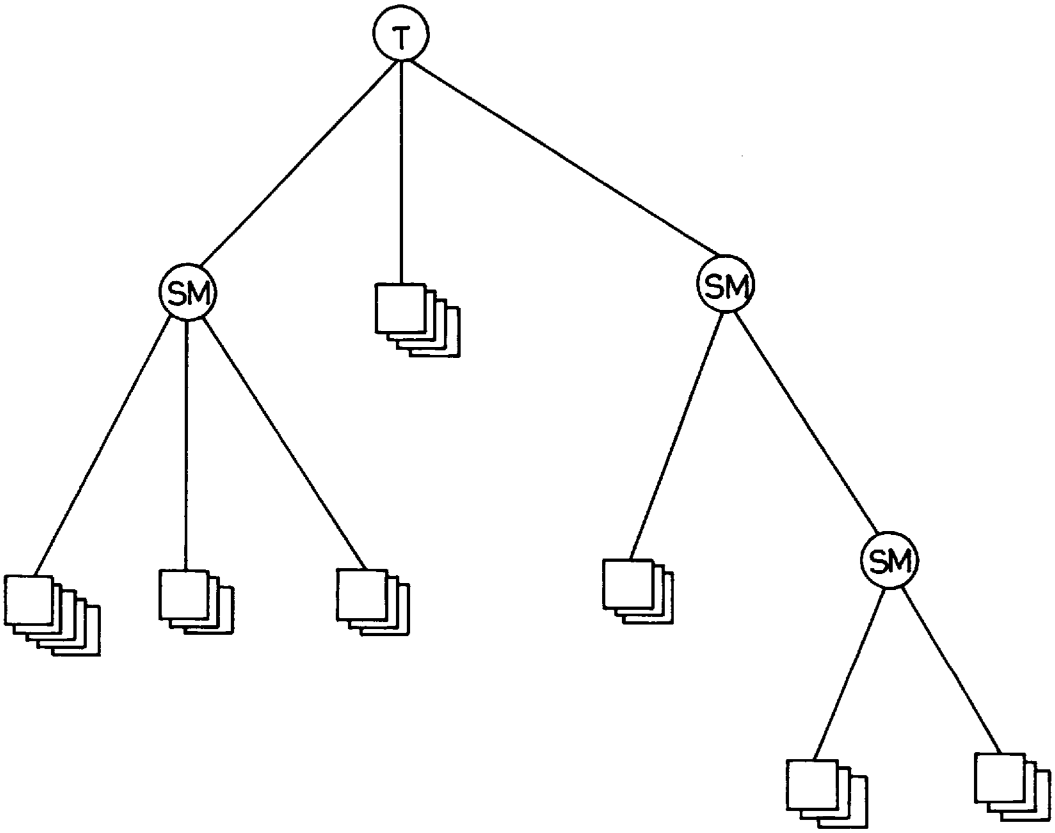
FIG. 30 is a tree structure diagram showing the program organization.
Figure 31:
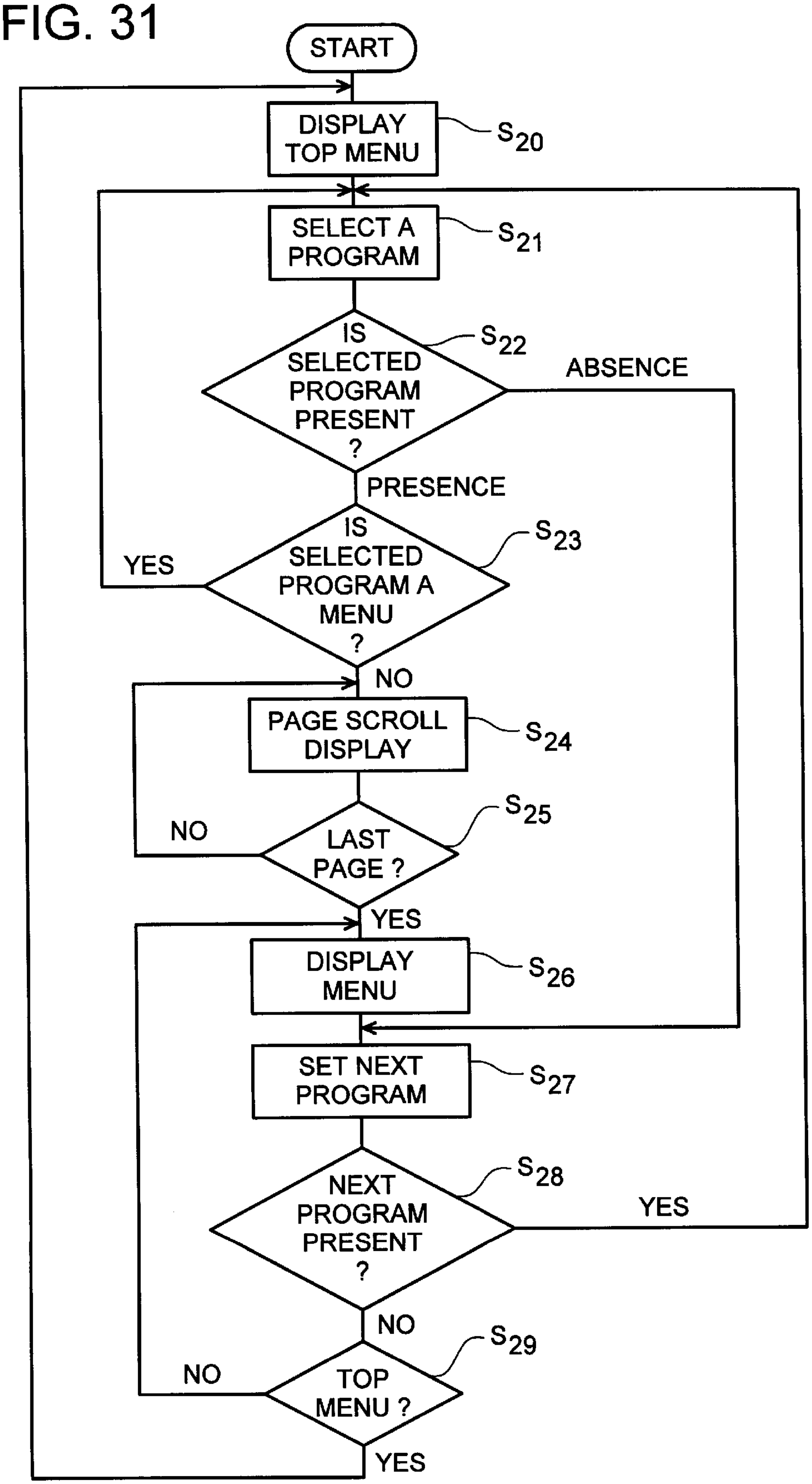
FIG. 31 is a flow chart for page-scroll display of the FM multiplex broadcasting receiver of the fourth embodiment.
Figures 32, 33:
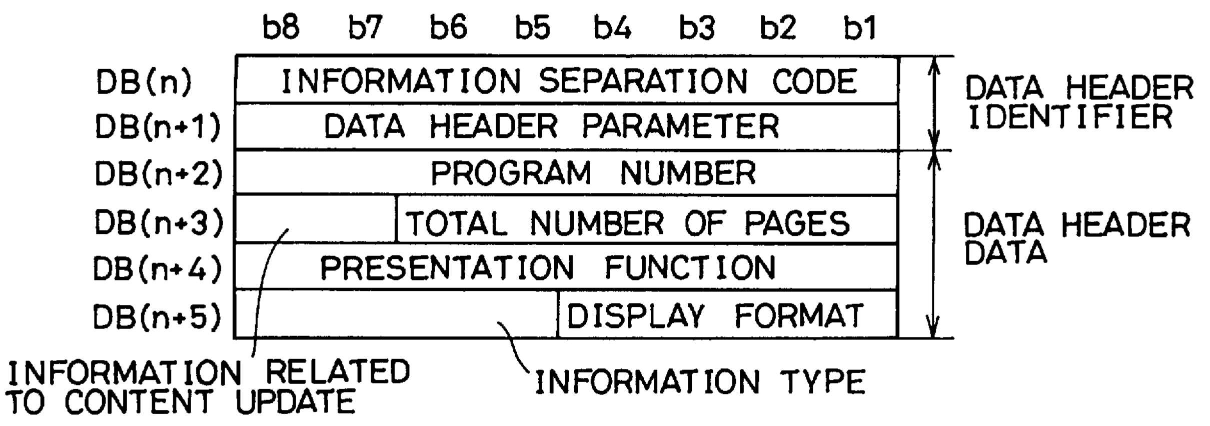
FIG. 32 PRIOR ART
FIG. 33 PRIOR ART
FIG. 32 shows a display format of FM multiplex broadcasting.
FIG. 33 shows a structure of a program data header.
Figure 34:
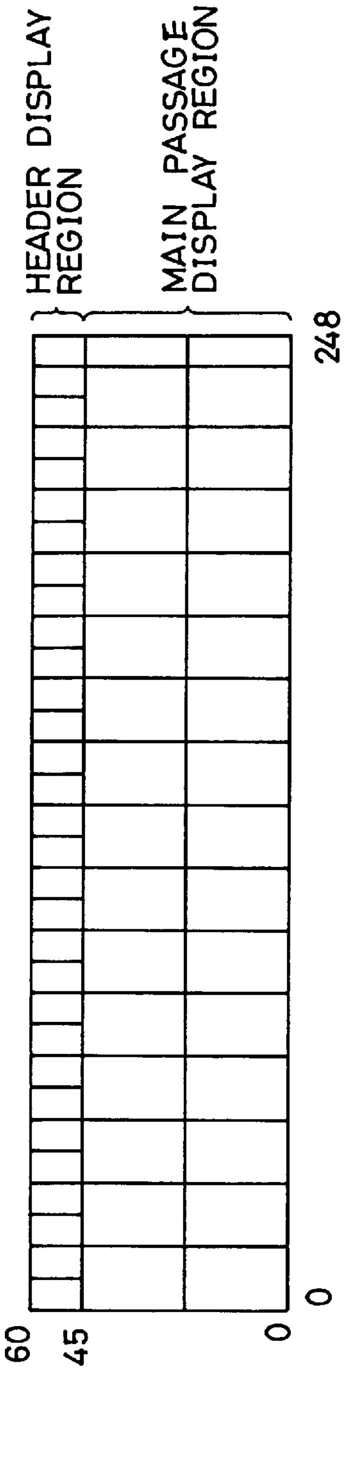
FIG.34 PRIOR ART
FIG. 34 shows a structure of a display region according to display format 0.

The above page forwarding display in association with program switching will be described in detail hereinafter. FIG. 30 is a tree structure of program organization. FIG. 31 is a flow chart for page scrolling display of the FM multiplex broadcasting receiver according to the fourth embodiment. A tree structure as shown in FIG. 30 is formed according to a plurality of programs that can be received by the FM multiplex broadcasting receiver. In the tree structure of FIG. 30, each "□" indicates a program. Each of the plurality of programs are managed by one top menu indicated by (T) and at least one submenu indicated by (SM). The submenus are managed by the top menu.

Referring to FIG. 31, in operation, the top menu is displayed (S20), and the default program or a submenu is selected by CPU 2*a* from the displayed top menu (S21).

Determination is made whether the selected program is present or not, i.e. whether the selected program is completed or not, according to a corresponding status flag SF of program management table 52 (S22). If the selected program is not present (uncompleted), the program proceeds to step S27 which will be described afterwards. If the selected program is present, determination is made whether it is a submenu or not (S23). When YES, the program returns to step S21 to select a program from this submenu.

When the selected program is not a submenu and is a completed program, a plurality of pages of information stored in program buffer 53 of that program are forwarded to be displayed until the last page (S24, S25). When the last page is displayed, the menu of one higher hierarchy in the tree structure of the program displayed right before is displayed for page scrolling display of the next program (S26). Then, the next program is selected from the displayed menu by CPU 2*a* (S27), and determination is made whether the next program is present or not (S28), similar to the above-described step S22. If the next program is present, a process similar to that subsequent step S21 is repeated. If the next program is a top menu (YES in S29), the program returns to step S20 to carry out a similar process. If the next program is not the top menu, the program returns to step S26 to carry out a similar subsequent process.

Thus, a completed program is sequentially selected from the menu while forwarding and displaying the selected program.

The present invention is not limited to the display of two pages of information on display unit 6 as in the FM multiplex broadcasting receiver of the present embodiment, and can include a display function of a plurality of pages of three or more pages. Also, although the header portion is omitted for the sake of description in the information of one page to be displayed, a display function for displaying the header portion can be included. Furthermore, the present invention is not limited to the described display format 0, and can be applied to other formats.

Each of the above-described first to fourth embodiments can be combined arbitrarily. Furthermore, each of the display examples can be combined arbitrarily with regard to the display manner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An FM multiplex broadcasting receiver comprising:

extraction means for extracting data from an FM multiplex broadcasting wave, the extracted data including a plurality of pages corresponding to a plurality of programs and having a predetermined display format;

display means, coupled to said extraction means, for displaying pages of the extracted data in the predetermined display format;

display control means, coupled to said extraction means and said display means, for controlling display of the pages of the extracted data to display a single page of extracted data on a screen of said display means and to display a plurality of pages of extracted data simultaneously on the screen of said display means in accordance with a selection signal indicative of a number of pages to be displayed; and selection means, coupled to said display control means, for generating and outputting the selection signal in accordance with manual selection, a page of extracted data comprising a header portion including identification data descriptive of the extracted data of a program and main data corresponding to program content of the extracted data of the program, the header portion and the main data being displayed when the selection signal is indicative of display of a single page of extracted data on the screen and only the main data being displayed when the selection signal is indicative of display of a plurality of pages of extracted data simultaneously on the screen.

2. The FM multiplex broadcasting receiver of claim 1, wherein the plurality of pages are displayed such that no blank lines are included between displayed pages.

3. The FM multiplex broadcasting receiver of claim 1, wherein the plurality of pages are displayed such that a ruled line is included between displayed pages.

4. The FM multiplex broadcasting receiver of claim 1, wherein said display control means controls said display means to display on the screen an identifier indicative of which of the plurality of pages of extracted data corresponds to a same one of the plurality of programs.

5. The FM multiplex broadcasting receiver of claim 4, wherein said identifier is a bracket.

6. The FM multiplex broadcasting receiver of claim 1, wherein said display control means controls said display means to display a first font if the selection signal is indicative of display of a single page of extracted data and a second font if the selection signal is indicative of display of a plurality of pages of extracted data simultaneously, the first font being larger than the second font.

* * * * *